(12) United States Patent
Enge et al.

(10) Patent No.: US 10,728,032 B2
(45) Date of Patent: Jul. 28, 2020

(54) SERVER ALGORITHMS TO IMPROVE SPACE BASED AUTHENTICATION

(71) Applicant: The Boeing Company, Chicago, IL (US)

(72) Inventors: Per K. Enge, Mountain View, CA (US); David Lawrence, Santa Clara, CA (US); Michael L. O'Connor, Redwood City, CA (US); Michael L. Eglington, San Bruno, CA (US); Gregory M. Gutt, Fairfax, VA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 15/608,024

(22) Filed: May 30, 2017

(65) Prior Publication Data

US 2017/0261616 A1  Sep. 14, 2017

Related U.S. Application Data

(62) Division of application No. 14/457,092, filed on Aug. 11, 2014, now Pat. No. 9,698,987, which is a division
(Continued)

(51) Int. Cl.
*G01S 19/21* (2010.01)
*H04L 9/32* (2006.01)
(Continued)

(52) U.S. Cl.
CPC ............. *H04L 9/32* (2013.01); *G01S 19/06* (2013.01); *G01S 19/215* (2013.01); *H04L 67/42* (2013.01); *H04W 12/06* (2013.01)

(58) Field of Classification Search
CPC ........ G01S 19/06; G01S 19/215; G01S 19/21; G01S 19/01; G01S 19/015; G01S 19/35;
(Continued)

(56) References Cited

U.S. PATENT DOCUMENTS 5,535,278 A   7/1996 Cahn et al.
5,541,606 A   7/1996 Lennen
(Continued)

FOREIGN PATENT DOCUMENTS

JP   11-512860   11/1999
JP   2005-265769   9/2005
(Continued)

OTHER PUBLICATIONS

Psiaki et al. (System Identification of a GNSS Receiver's RF Filter Impulse Response Function, 24th International Technical Meeting of the Satellite Division of the Institute of Navigation, Sep. 2011 (Year: 2011).*
(Continued)

*Primary Examiner* — Said M Elnoubi
(74) *Attorney, Agent, or Firm* — McDonnell Boehnen Hulbert & Berghoff LLP

(57) ABSTRACT

A system and methods for location authentication are presented. An estimated server signal is estimated based on a generated known code signal, and a client received satellite signal is received from a client device. The client received satellite signal is compared to the estimated server signal to provide a comparison result.

20 Claims, 20 Drawing Sheets

Related U.S. Application Data of application No. 13/653,041, filed on Oct. 16, 2012, now Pat. No. 8,604,866.

(51) Int. Cl.
*H04L 29/06* (2006.01)
*H04W 12/06* (2009.01)
*G01S 19/06* (2010.01)

(58) Field of Classification Search
CPC .......... G01S 19/37; G01S 19/38; G01S 19/39; G01S 19/03; H04L 9/32; H04L 67/42; H04W 12/06; H04W 64/00
See application file for complete search history.

(56) References Cited

U.S. PATENT DOCUMENTS

| | | | |
|---|---|---|---|
| 5,610,984 | A | 3/1997 | Lennen |
| 5,663,733 | A | 9/1997 | Lennen |
| 5,708,439 | A | 1/1998 | Lennen |
| 5,754,657 | A | 5/1998 | Schipper et al. |
| 5,757,916 | A | 5/1998 | MacDoran et al. |
| 5,825,887 | A | 10/1998 | Lennen |
| 6,125,135 | A | 9/2000 | Woo et al. |
| 6,934,631 | B2 | 8/2005 | Dentinger et al. |
| 7,609,201 | B2 | 10/2009 | Masuda |
| 7,969,354 | B2 | 6/2011 | Levin et al. |
| 8,068,054 | B2 | 11/2011 | Levin et al. |
| 8,068,533 | B2 | 11/2011 | Levin et al. |
| 8,068,534 | B2 | 11/2011 | Levin et al. |
| 8,837,728 | B2 | 9/2014 | Enge et al. |
| 2005/0146459 | A1 | 7/2005 | Dentinger et al. |
| 2007/0001899 | A1 | 1/2007 | Lawrence et al. |
| 2007/0106472 | A1 | 5/2007 | Dentinger et al. |
| 2007/0194984 | A1 | 8/2007 | Waid |
| 2007/0230545 | A1 | 10/2007 | Lennen |
| 2009/0195443 | A1 | 8/2009 | Levin et al. |
| 2011/0041038 | A1 | 2/2011 | Aasheim et al. |
| 2012/0121087 | A1 | 5/2012 | Psiaki |
| 2012/0122471 | A1 | 5/2012 | Kohli et al. |
| 2013/0002486 | A1 | 1/2013 | Fridman |
| 2013/0081119 | A1 | 3/2013 | Sampas |
| 2013/0127664 | A1* | 5/2013 | Garin ................ G01S 19/24 342/357.63 |
| 2014/0094207 | A1* | 4/2014 | Amizur ............ H04W 72/044 455/509 |
| 2014/0273857 | A1* | 9/2014 | White ..................... G01S 5/00 455/41.2 |
| 2014/0351576 | A1 | 11/2014 | Enge et al. |
| 2017/0292977 | A1* | 10/2017 | Pickerd ............. G01R 13/225 |

FOREIGN PATENT DOCUMENTS

| | | |
|---|---|---|
| JP | 2011-049748 | 3/2011 |
| JP | 2015-504516 | 2/2015 |

OTHER PUBLICATIONS

Notification of Reasons for Rejection with English Translation, issued by the Japanese Patent Office in patent application No. 2018-112783, dated Jun. 18, 2019.
M. Psiaki, B.W. O'Hanlon, J. Bhatti, D. Shepard and T. Humphreys, "Civilian GPS Spoofing Detection Based on Dual-Correlation of Military Signals," 24th International Technical Meeting of the Satellite Division of the Institute of Navigation, Portland OR, Sep. 19-23, 2011.
M. Psiaki and B.W O'Hanlon, "System Identification of a GNSS Receiver's RF Filter Impulse Response Function," 24th International Technical Meeting of the Satellite Division of the Institute of Navigation, Portland OR, Sep. 19-23, 2011.
PCT/US2013/059648- International Search Report and Written Opinion dated Feb. 26, 2014 filed on the basis of the subject U.S. pending application.
Lo S et al: "Signal Authentication—a Secure Civil GNSS for Today", Inside GNSS, Gibbons Media, US, Sep. 1, 2009 (Sep. 1, 2009), pp. 30-39, XP002616381, ISSN: 1559-503X p. 32-p. 34; figures 1,2.
Annex to Pursuant to Article 94(3) EPC Issued in European Patent Application No. 13765919.9 dated Jun. 2, 2016.
Lorenzo et al., "Signal Authentication a Secure Civil GNSS for Today", Sep. 2009, InsideGNSS, pp. 30-39.
Chen, Xihui et al., "Implementation and Validation of a Localisation Assurance Service Provider", 2012, IEEE, pp. 1-8.
Globecom, Globecom '03, IEEE Global Telecommunications Conference (IEEE Cat. No. 03CH37489), 2003, IEEE, pp. 1-105.
Hedgecock, Will et al., "A Differential Relative GPS Track Solution", Jun. 2013, ACM, p. 475.
Madurasinghe, D. et al., "Target Localization by Resolving the Time Synchronization Problem in Bistatic Radar Systems Using Space Fast-Time Adaptive Processor", Jun. 2009, Hindawi Publishing Corp., vol. 2009.
Brady W. O'Hanlon, et al., "Real-Time Spoofing Detection in a Narrow-Band Civil GPS Receiver", Proceedings of the 23rd International Technical Meeting of the Satellite Division of the Institute of Navigation (ION GNSS 2010).

\* cited by examiner

SERVER ALGORITHMS TO IMPROVE SPACE BASED AUTHENTICATION

CROSS-REFERENCE TO RELATED APPLICATION

The present application is a divisional of U.S. application Ser. No. 14/457,092, filed on Aug. 11, 2014, which is a divisional of U.S. application Ser. No. 13/653,401, filed Oct. 16, 2012 (now U.S. Pat. No. 8,837,728), the entire contents of each of which are herein incorporated by reference.

FIELD

Embodiments of the present disclosure relate generally to radio communication systems. More particularly, embodiments of the present disclosure relate to satellite systems for location authentication.

BACKGROUND

A significant fraction of power in signal components of a satellite signal such as a Global Navigation Satellite System (GNSS) signal may be lost when the GNSS signal passes through band-pass filters used by a receiver of a GNSS client device. Furthermore, a correlation with the GNSS signal may multiply noise in the GNSS signal causing a squaring loss. Loss of power and squaring loss significantly degrade performance in low signal-to-noise-ratio (SNR) environments. Degraded performance in low SNR environments may prevent or minimize an ability of an authentication system to validate that a global position computation or an assertion based on a global position is bona fide.

SUMMARY

A system and methods for location authentication are presented. An estimated server signal is estimated based on a generated known code signal, and a client received satellite signal is received from a client device. The client received satellite signal is compared to the estimated server signal to provide a comparison result.

Client equipment may be simple in such a way that the client received satellite signature is a co-mingled sum of known and unknown signal components from satellites in view of the client device. A subset of the signal components within the client received satellite signature are compared to the estimated server code signal to provide a comparison result. Authenticity derives from a comparison of a client received unknown Y code or a low-rate code such as a W code to a server received unknown Y code or W code. A server may also compensate for a relatively narrow bandwidth of the client received satellite signature.

In this manner, embodiments of the disclosure provide an authentication system that enables location authentication for client devices located in low signal-to-noise-ratio (SNR) environments such as indoors and downtown.

In an embodiment, a method for location authentication receives a client received coded satellite signal from a client device, and receives a server received coded satellite signal from a satellite receiver device. The method further estimates an estimated client known high-rate code based on one of: the client received coded satellite signal and the server received coded satellite signal. The method further extracts an estimated client unknown low-rate code signal from the client received coded satellite signal based on the estimated client known high-rate code. The method further estimates an estimated server known high-rate code based on the server received coded satellite signal. The method further extracts an estimated server unknown low-rate code signal from the client received coded satellite signal based on the estimated server known high-rate code. The method further compares the estimated client unknown low-rate code signal to the estimated server unknown low-rate code signal to provide a unknown low-rate code comparison result.

In another embodiment, a method for location authentication constructs an estimated server unknown high-rate encrypted code signal based on an estimated server unknown low-rate code signal and a generated known high-rate code signal. The method further receives a client received unknown high-rate encrypted code satellite signal from a client device. The method further compares the client received unknown high-rate encrypted code satellite signal to the estimated server unknown high-rate encrypted code signal to provide a code comparison result.

In a further embodiment, a method for location authentication receives a client filtered satellite signal from a client device, the client filtered satellite signal comprising a client received satellite signal filtered through a client signal filter. The method further determines filter characteristics of the client signal filter by one of: receiving the filter characteristics from the client device, and estimating a transfer function of the client signal filter based on the client filtered satellite signal. The method further configures an emulating signal filter to emulate the client signal filter based on the filter characteristics. The method further receives a server received satellite signal from a satellite receiver device, and filters the server received satellite signal with an emulating signal filter emulating the client signal filter to provide an emulated filtered satellite signal. The method further compares the client received satellite signal and the emulated filtered satellite signal to provide a signal comparison result.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
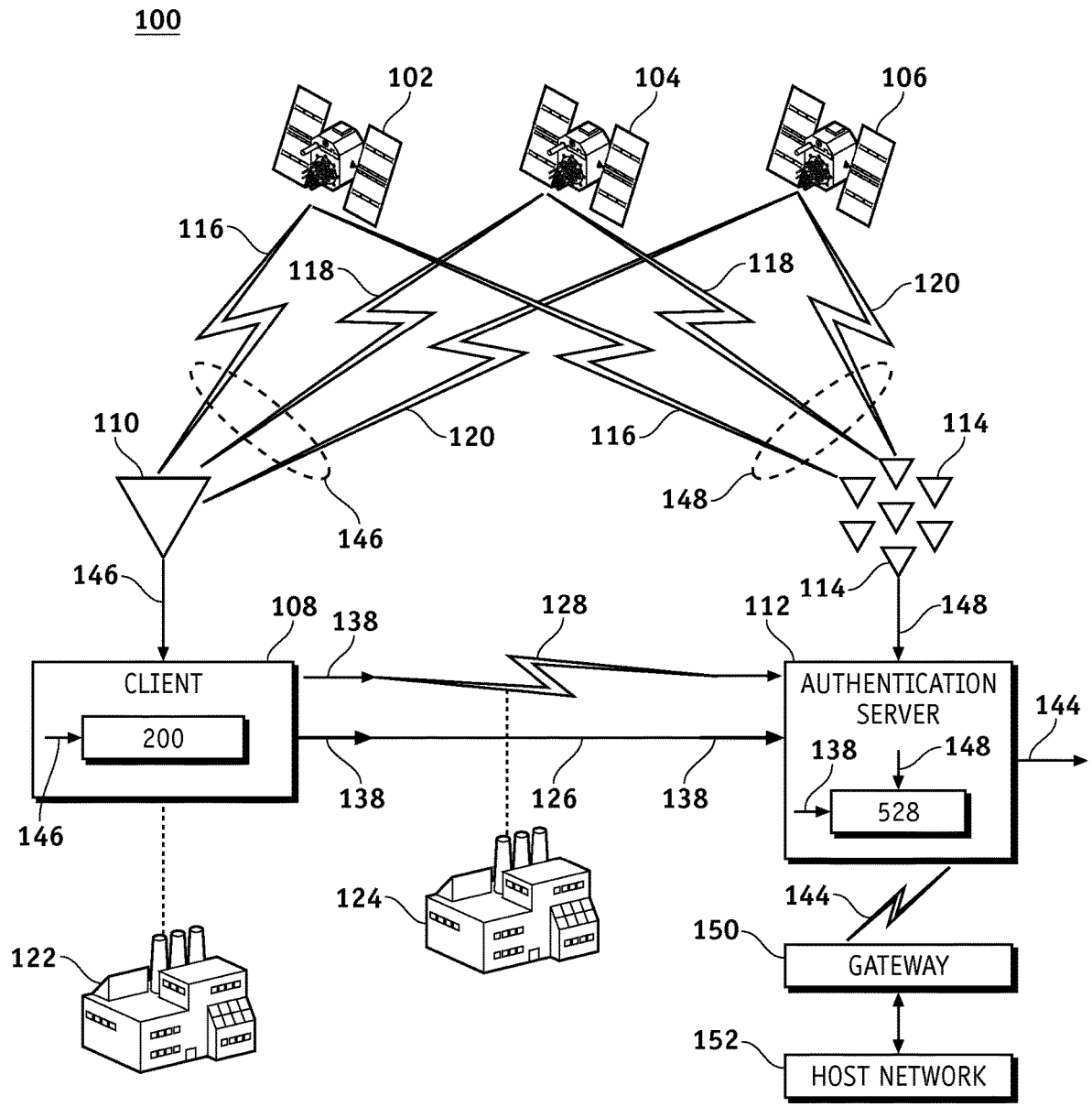
FIG. 1 is an illustration of an exemplary wireless communication environment for authenticating an asserted location based on satellite signals according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network protocols, global positioning systems, and other functional aspects of the systems (and the individual operating components of the systems) may not be described in detail herein.

Embodiments of the disclosure are described herein in the context of a non-limiting application, namely, an authentication system for a cyber and network security application. Embodiments of the disclosure, however, are not limited to such cyber and network security applications, and the techniques described herein may also be utilized in other applications. For example, embodiments may be applicable to a desktop computer, a laptop or notebook computer, an iPod™ an iPad™, a cell phone, a personal digital assistant (PDA), a mainframe, an internet protocol (IP) node, a server, a Wi-Fi node, a server, a client, a router, or any other type of special or general purpose computing device as may be desirable or appropriate for a given application or environment.

Embodiments of the disclosure may use terms such as user, user device, claimant, client device, client receiver, client, or other similar term to refer to a computing device that is attempting to be validated (authenticated) whether or not it is or is not, at some point validated (authenticated). The computing device may be further attached to a person or entity that is utilizing the computing device attempting to gain access to a protected resource through means requiring the computing device to be authenticated.

The following distinction is made for clarity. The client device if legitimate and appropriately configured may be transmitting true (valid) data, however; from an authentication processor perspective this data is viewed as "client" data. Similarly, a spoofer, rogue, or other similar type of user device that submits invalid data (purposely or otherwise), may submit the invalid data to the authentication processor and it is still viewed as "client" data from the perspective of the authentication processor.

It may be important to note that in some embodiments, once an authentication decision has been made the authentication system may take further action. Such actions may comprise, for example but without limitation, providing the client device access to a protected resource, restricting access to a protected resource, directing the client device to a honeypot, or other action. It should be noted that an authentication decision may be made by the authentication server or it may be may by another element within the authentication system, such as the gateway. The decision making element may make an authentication decision (for example, such as whether a claimant device should have access to at least one protected resource and to what degree of access privileges the claimant has) using defined policies or it may be the authentication decision itself. In at least one embodiment, the authentication server or gateway may be further tied to an authorization server.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Embodiments of the disclosure provide an authentication system that provides adequate received signal strength for a satellite signal to be received at a client device (client) located in a low signal-to-noise-ratio (SNR) environment such as indoors in a city building.

Embodiments of the disclosure provide techniques for code-wipeoff and bandwidth compensation to improve performance for clients located indoors or downtown. In contrast to existing systems, embodiments of the disclosure locate known P code, encrypted Y code and unknown W code algorithms entirely at the authentication server. As such, they do not increase a complexity of client equipment. Embodiments comprise server algorithms to compensate for narrow bandwidth of the client equipment. Embodiments are based on a simple data sets provided by the client or bandwidth estimation based solely on radio samples received from the client.

Embodiments of the disclosure are described herein in the context of a non-limiting application, namely, an authentication system for a cyber and network security application that uses a known high-rate code such as a known P code of a Global Positioning System (GPS™), a unknown low-rate code such as a unknown W code of a GPS™ system, and a unknown high-rate encrypted code such as an encrypted Y code (P(Y) code) of a GPS™ system that may comprise a product of known high-rate code and the unknown low-rate code. Embodiments of the disclosure, however, are not limited to such known P codes, unknown W codes and encrypted Y codes, and the techniques described herein may also be utilized in other applications. For example, embodiments may be applicable to other known high-rate codes, other unknown low-rate codes, and other unknown high-rate encrypted codes.

FIG. 1 is an illustration of an exemplary wireless communication environment 100 (environment 100) for authenticating a claimed location based on satellite signals according to an embodiment of the disclosure. The environment 100 may comprise satellites 102, 104 and 106, a client device 108 comprising a client receiver 200, and an authentication server 112 comprising a server receiver 528.

Each of the satellites 102-106 may comprise, for example but without limitation, an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, an Iridium™ satellite, a GlobalStar™ satellite, an Iridium™ NEXT satellite or other satellite. Each of the satellites 102-106 may operate in, for example but without limitation, a low Earth orbit (LEO), a medium Earth orbit (MEO), a geosynchronous Earth orbit (GEO), a Molniya orbit, a polar orbit, an elliptical orbit, or other orbit.

Satellite signals 116, 118 and 120 transmitted from the satellites 102, 104 and 106 respectively can be processed at the client device 108 to determine a velocity, a time and a location 122 of the client device 108. However, satellite signals may be spoofed in existing systems such that an existing client senses and/or reports a false position 124. Spoofing is becoming of general concern because networked systems are increasingly being used to support location transactions that have financial value or safety-of-life implications.

The client device 108 comprises the satellite receiver 200 (client receiver 200) and is configured to track and locate the client device 108 based on information of each of the satellite signals 116-120 through client received satellite signals 146 (client received signals 146) via a client antenna 110. The client receiver 200 is able to collect and store digital samples of digital client received signals 222 (FIG. 2) of the (radio frequency (RF) signals) client received signals 146. The client receiver 200 is explained in more detail in the context of discussion of FIG. 2 below.

The client device 108 is configured to authenticate its location to a gateway 150, as explained in more detail below.

The client device 108 may support many consumer applications. For example, many financial transactions utilize mobile devices as the client device 108 (e.g., cell phones or laptops) in an interior space such as within a city building. The client device 108 may comprise, wired or wireless communication devices such as, but without limitation, a desktop computer, a laptop or notebook computer, an iPod™, an iPad™, a cell phone, a personal digital assistant (PDA), a mainframe, an internet protocol (IP) node, a server, a Wi-Fi node, a server, a client, a router, or other type of special or general purpose computing device that comprises a receiver such as the satellite receiver 200 capable of receiving the client received signals 146, and as may be desirable or appropriate for a given application or environment.

The authentication server 112 is configured to perform code-wipeoff and compensate for narrow bandwidth of the client device 108 equipment to improve performance for the client device(s) 108 located indoors or downtown based on radio samples of a client received coded satellite signal 138 received from the client device 108. A client received coded satellite signal 138, a client signature 138, and a client signature set 138 may be used interchangeably in this document.

The authentication server 112 may receive the client received coded satellite signal 138 from the client device 108 via a wired communication link 126, a wireless communication channel 128, other communication means, a combination thereof, or in some embodiments replicate the client signature set 138 locally at the authentication server 112. The authentication server 112 comprises a server satellite receiver 528 (server receiver 528) and is configured to receive the satellite signals 116-120 through server received signals 148 via a server antenna 114. The server receiver 528 is explained in more detail in the context of discussion of FIG. 5 below.

The authentication server 112 authenticates the location 122 of the client device 108 based on the client received coded satellite signal 138 received from the client device 108 and a server received coded satellite signal 530 (FIG. 5) received from the satellite receiver 528 as explained in more detail below.

In one embodiment the gateway 150 and the authentication server 112 reside in different locations and communicate through a public or semi-public communication network via the wired communication link 126, the wireless communication channel 128, other communication means, or a combination thereof. In another embodiment, the gateway 150 and authentication server 112 communicate through a virtual private network (VPN) connection or other method of encryption that would enable a validity of an authentication decision message 144 between the gateway 150 and the authentication server 112 to be trusted.

Many financial transactions utilize cell phones such as the client device 108 in an "indoors" or "downtown" environment where they may occur on platforms that are low cost and in signal obstructed operating environments. A cost-effective satellite-based authentication system may use data available from a satellite receiver in a cell phone such as the satellite receiver 200. The cost-effective satellite-based authentication system may also be robust to poor signal environments comprising the client received signals 146 that are expected where cell phone users congregate, e.g., "indoors" and "downtown". The first criterion is reflected in FIG. 2 that shows basic signal processing steps in the satellite receiver 200. The second criterion for a satellite-based authentication system is depicted in FIG. 3.

Figure 2:
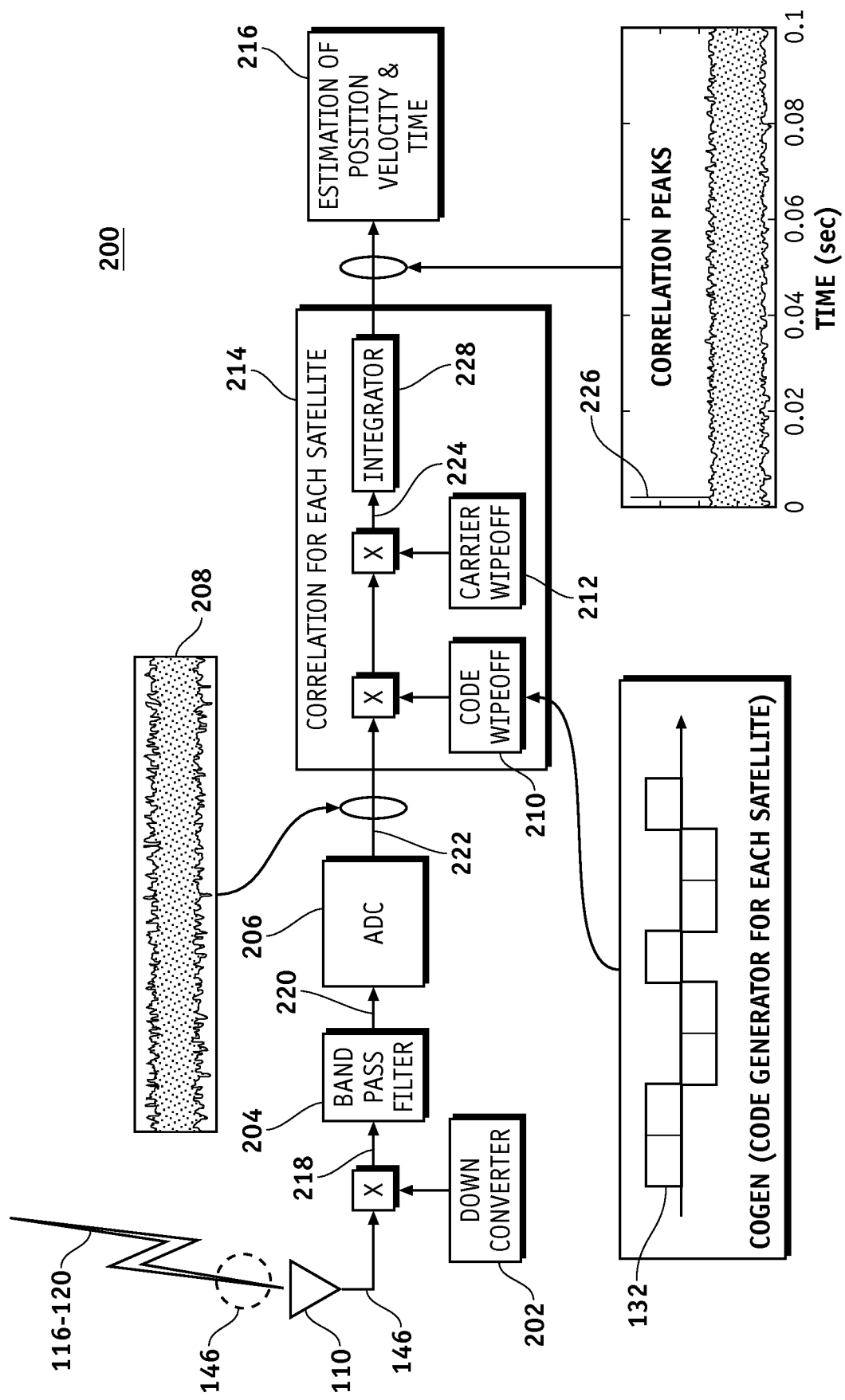
FIG. 2 is an illustration of an exemplary simplified functional block diagram of a satellite receiver.
Figure 3:
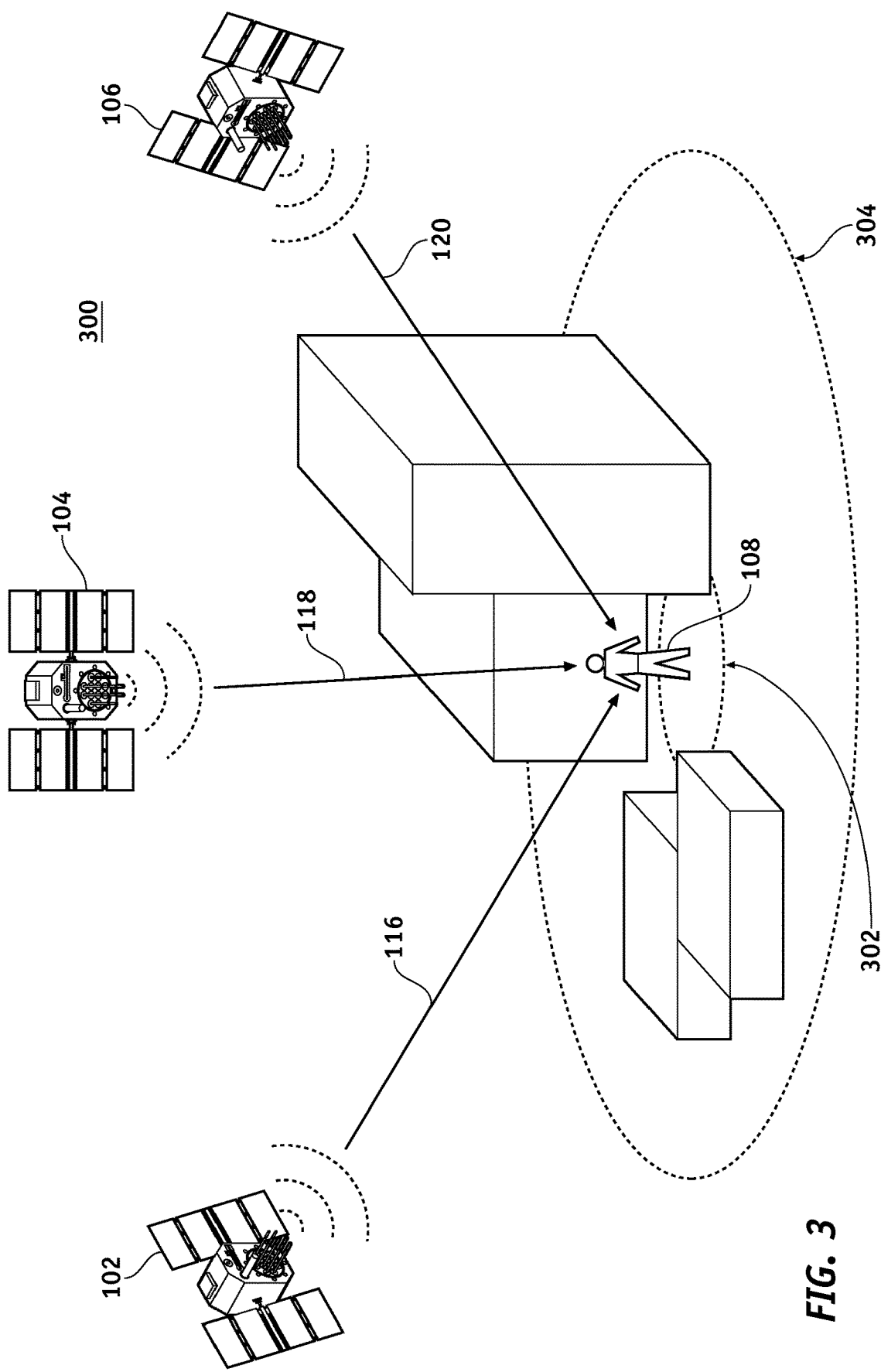
FIG. 3 is an illustration of an exemplary wireless communication environment showing ways in which indoor and downtown environments can attenuate satellite signals.

FIG. 2 is an illustration of an exemplary simplified functional block diagram of the satellite receiver 200 (client receiver 200) shown in FIG. 1. The client receiver 200 may comprise, for example but without limitation, a GPS receiver, or other satellite receiver. As shown in FIG. 2, the satellite receiver 200 receives radio frequency signals such as the client received signals 146 at the client antenna 110. The client receiver 200 then demodulates the client received signals 146 from the satellite signals 116-120 received at the client device 108 from the satellites 102-108 respectively. The client receiver 200 demodulates the client received signals 146 from the satellite signals 116-120 received at the client device 108 by down converting the client received signals 146 from radio frequency (RF) to baseband by the down convertor 202 and band-pass filtering the down converted client received signals 218 by the band-pass filter 204.

As mentioned above, a significant fraction of a power in the unknown Y code signal component of the satellite signals 116-120 or the client received signals 146 may be lost when the client received signals 146 pass through the band-pass filter 204. For GPS, signals modulated by the unknown Y code signals have a noise equivalent bandwidth of 10 MHz, whereas the noise equivalent bandwidth of civil C/A code signals (C/A code) is about 1 MHz. The civil C/A code signals are utilized by the client receiver 200 in the client device 108 such as cell phones, generally not the unknown Y code signals. Hence, the band-pass filter 204 in cell phones generally has a bandwidth of only a few MHz, and so an appreciable fraction of signal power of signals comprising the unknown Y code is lost. Loss of signal power degrades performance in low signal-to-noise-ratio (SNR) environments. Degraded performance may prevent or minimize an ability of the authentication server 112 to validate that a global position computation, or an assertion based on a global position, is bona fide.

The client receiver 200 then converts band-pass filtered client received signals 220 from analog signals to digital signals by an analog to digital converter (ADC) 206 to provide the digital client received signals 222. The satellite receiver 200 then removes the spectrum-spreading code 132 (C/A code) from the digital client received signals 222 by a code wipe-off 210. The satellite receiver 200 then removes a carrier signal from the digital client received signals 222 by a carrier wipe-off 212 to provide a baseband digital client received signals 224.

Most client receiver(s) 200 then correlate the baseband digital client received signals 224 with an internal replica of a known C/A code 404 (FIG. 4) at the client device 108 using a correlation module 214 to estimate the location 122, a velocity and a time offset of the client device 108 at an output 216 based on a correlation peak 226. The location 122 can be computed using more than a minimum number of satellites (four satellites to compute latitude, longitude, elevation, and satellite/GPS time).

In the client receiver 200, the baseband digital client received signals 224 are generally substantially noisy, but the internal replica of the known C/A code 404 is noise-free. Correlation multiplies the digital client received signals 224 and the internal replica of the known C/A code 404 and integrates the resulting product by the integrator 228. As such, the client receiver 200 multiplies a noisy signal and a noise free replica signal of the known C/A code 404. If a server is used to process unknown codes (e.g. GPS Y code), receivers may correlate a signature from a client with the radio signals received at a server. Thus, an underlying correlation product comprises noise (from the client) multiplied by noise from the server. This noise product degrades the noise performance of authentication, and the attendant performance loss is called squaring loss. This loss increases when the underlying codes have high chipping rates, because the noise squared term increases when the pre-correlation filters admit more noise.

FIG. 3 is an illustration of an exemplary wireless communication environment (environment 300) showing indoor and downtown environments that can attenuate the satellite signals 116-120. A nominal received signal strength 304 of the received GPS signal is approximately −130 dBm (or 10E-16 Watts). The satellite receiver 200 in the client device 108 under open sky can expect the nominal received signal strength 304. However, the client device 108 such as a cell phone may operate indoors such as in a city building where an attenuated received signal strength 302 drops to −140 dBm or −160 dBm or even weaker. Thus, the authentication server 112 should operate at these lower levels of the attenuated received signal strength 302.

Figure 4:
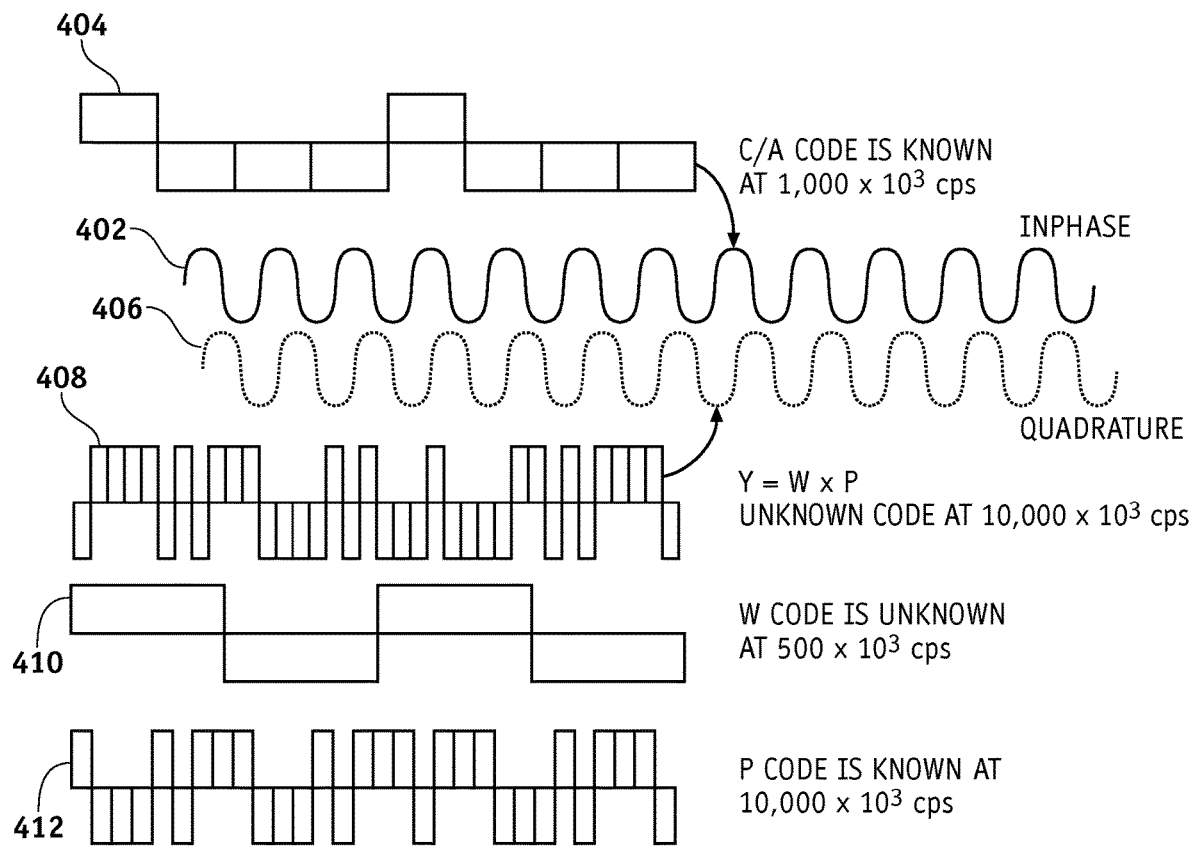
FIG. 4 is an illustration of an exemplary diagram showing a signal structure of a satellite.

FIG. 4 is an illustration of an exemplary diagram showing a signal structure 400 of each of the satellites 102-106. Each of the satellite signals 116-120 comprises a signal 402 at a frequency (carrier frequency) such as a GPS L1 frequency, which is used as a carrier (in-phase carrier 402) to modulate a data signal that is modulated with a spreading code such as a Code Division Multiple Access (CDMA) code, commonly referred to as a "Coarse/Acquisition" (C/A) code 404 (spectrum-spreading code 404). For a GPS system, the C/A code may be variously known as "Coarse/Acquisition", "Clear/Access", and "Civil/Access". Each of the satellites 102-106 transmits at least one other signal employing the carrier frequency that is shifted 90 degrees-Quadrature signal 406.

The at least one other signal (second signal) is modulated by another code, known as an encrypted "P(Y)" code 408. The encrypted P(Y) code 408 is either a "precision" (P) code 412, which is publicly known, or an encrypted "Y" code 408 (unknown Y code 408). Many GNSS satellites use the encrypted Y code 408 and, consequently, a resulting transmitted signal that is encoded with the encrypted Y code 408 cannot be used by other than those having a decryption algorithm and a key for the encrypted Y code 408. In addition, a navigation message (not shown) modulates both the (known) P and the (unknown) Y code broadcast by the satellites 102, 104, 106.

The unknown Y code 408 is a product of the known P code 412 and an unknown W code 410. The Y code 408 is a fast spread spectrum code with a chipping rate of about $10 \times 10^6$ chips per second (10.23 Mcps). The P code 412 is another fast spread spectrum code that also has a chipping rate of about $10 \times 10^6$ chips per second (10 Mcps). The unknown W code 410 is a relatively slow spread spectrum code with a chipping rate of about $0.5 \times 10^6$ chips per second (0.5 Mcps). For comparison, the encrypted Y code 408 and the P code 412 are ten times faster than the most-oft used known C/A code 404 (spectrum-spreading code 404) that has a chipping rate of about $1 \times 10^6$ chips per second (1.023 Mcps). In contrast, the unknown W code 410 has a chipping rate that is one half the chipping rate of the known C/A code 404.

In this document, a known C/A code and a GPS C/A code may be used interchangeably; an encrypted P(Y) code and a GPS P(Y) code may be used interchangeably; a unknown W code and a GPS W code may be used interchangeably; and a known P code and a GPS P code may be used interchangeably.

Most GPS receivers such as the client receiver 200 correlate the baseband digital client received signals 224 with an internal replica of the known C/A code 404 at the client device 108. In this case, the baseband digital client received signals 224 is noisy, but the replica of the known C/A code 404 is noise-free. Correlation multiplies the baseband digital client received signals 224 and an internal replica of the known C/A code 404 and integrates the resulting product by the integrator 228. As such, the client receiver 200 multiplies a noisy signal and a noise free signal.

In existing server-based systems, noise (from the client) multiplied by noise from the server produces a noise product that degrades noise performance of authentication, and attendant performance loss is called squaring loss. The squaring loss increases when underlying codes have high chipping rates, because a noise squared term increases when pre-correlation filters admit more noise.

For example, in commercial applications, the C/A code 404 is publicly known and, consequently, an existing satellite receiver can be vulnerable to spoofing. In existing systems, a hostile party can generate a facsimile of one or more satellite signals to produce counterfeit spoofing signals that could carry incorrect information. An existing satellite receiver at a client device that accepts the bogus signals may be spoofed to compute an incorrect position, and may be spoofed to compute a position that the hostile party wishes to have the existing satellite receiver compute. Spoofing may be ineffective on those able to use the Y code because this code is not publicly known, so a hostile party should not be able to create a signal that appears bona fide.

To improve performance for clients located indoors or downtown, embodiments of the disclosure provides techniques for low-noise code-wipeoff and bandwidth compensation. In contrast to existing systems, embodiments of the disclosure locate the known P code, encrypted Y code and unknown W code algorithms entirely at the authentication server. As such, they do not increase the complexity of the client equipment. Embodiments use server algorithms to compensate for narrow bandwidth of the client equipment. In contrast to existing systems, these algorithms are based on a simple data set provided by the client or bandwidth estimation based solely on radio samples received from the client.

As discussed above, the encrypted P(Y) code 408 (Y code 408) is the product of the known P code 412 and the unknown W code 410. In other words, $Y = P \times W$. Removal of the known P code 412 is possible, because it is a known code that is synchronized to the C/A code 404. Removal of the known P code 412 yields an estimate of the unknown W code 410, because $P \times Y = P \times (P \times W) = P^2 \times W = W$. This operation is valuable, because the W code bandwidth is 20 times smaller than bandwidth of the Y code 408 or the known P code 412. This reduction enables two advantages. First, the unknown W code 410 can be sent from the client device 108 to the server 112 with a data field that is twenty times smaller. Second, the W×W noise products are smaller than the Y×Y noise products, because the W code bandwidth is smaller than the Y code bandwidth.

Embodiments utilize simple client equipment. Thus, a P code generator and a synchronization process is not added to the client device 108. Embodiments place a P code wipeoff, a Y code wipeoff and a W code wipeoff entirely within the server 112 as described in more detail below in the context of discussion of FIGS. 5-11 below.

Figure 5:
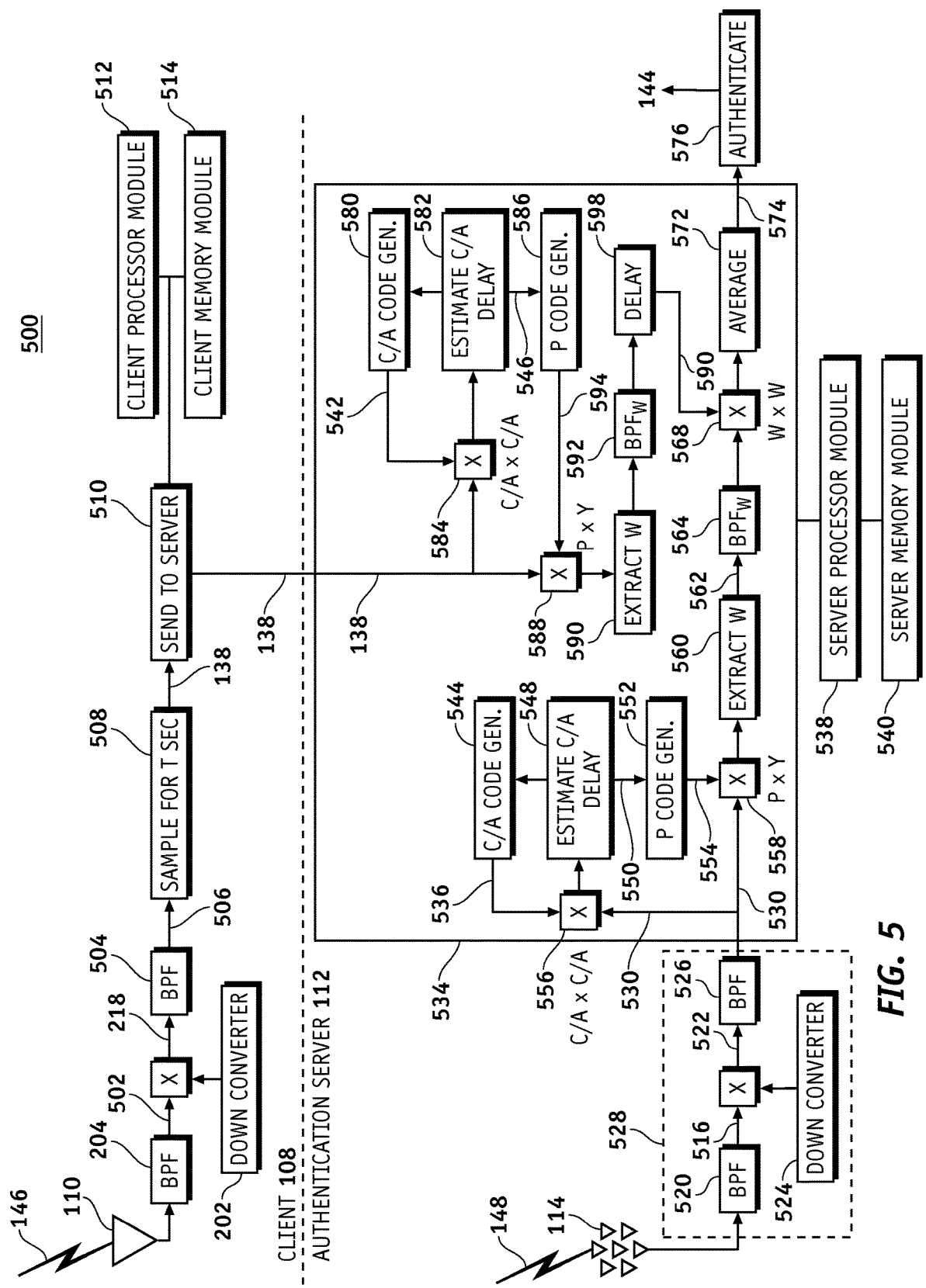
FIG. 5 is an illustration of an exemplary functional block diagram of an authentication system showing code wipeoff of client data and server data at an authentication server according to an embodiment of the disclosure.

FIG. 5 is an illustration of an exemplary functional block diagram of an authentication system 500 showing code wipeoff of client data and server data at the server 112 according to an embodiment of the disclosure. System 500 moves the P code wipeoff to the server 112 and builds a W×W product as part of the correlation process. System 500 comprises the client device 108, the server 112, and an authentication response module 576.

The client device 108 demodulates the client received signals 146 from the satellite signals 116-120 received at the client device 108 by band-pass filtering the client received signals 146 by the band-pass filter 204 to provide a first band-pass filtered signal 502. The client device 108 then down converts the first band-pass filtered signal 502 from radio frequency (RF) to baseband by the down convertor 202 to provide the down converted client received signals 218 and band-pass filters the down converted client received signals 218 by the band-pass filter 504 to provide a second band-pass filtered signal 506. In various embodiments, the above described process of band-pass filtering and down conversion can be implemented in various ways.

The client device 108 may further comprise a sample data module 508, a client processor module 512 (processor module 512), and a client memory module 514 (memory module 514). The second band-pass filtered signal 506 is digitized and then sampled for a period of time (e.g., microseconds, milliseconds, seconds) at the sample data module 508 to provide the client received coded satellite signal 138 (client signature 138). The client signature 138 is then transmitted to the server 112 via the processor module 512.

The client signature 138 sent from the client device 108 to the authentication server 112 comprises a radio frequency or intermediate frequency (RF/IF) signature 208 (FIG. 2). The RF/IF signature 208 comprises samples of the client received signals 146 (radio frequency (RF) or intermediate frequency (IF) signal) captured by the client antenna 110 at the client device 108.

The server 112 may comprise a satellite receiver 528 comprising: the server antenna 114, a band-pass filter 520, a down converter 524, and a band-pass filter 526. The server 112 may also comprise an authentication module 534, a server processor module 538 (processor module 538), and a server memory module 540 (memory module 540).

The satellite receiver 528 demodulates the server received signals 148 from the satellite signals 116-120 received at the server 112 by band-pass filtering the server received signals 148 by a band-pass filter 520 to provide a first server band-pass filtered signal 516. The server 112 then down converts the first server band-pass filtered signal 516 from radio frequency (RF) to baseband by the down convertor 524 to provide a down converted server received signals 522 and band-pass filters the down converted sever received signals 522 by the band-pass filter 526 to provide the server received coded satellite signal 530.

The authentication module 534 comprises a server C/A code generator 544, a server C/A delay estimator 548, a server P code generator 552, a server P×Y multiplier 558, a server $BPF_w$ 564, a server W code multiplier 568 (W×W multiplier 568), and an integrator 572 (average).

The server C/A delay estimator 548 estimates a time synchronization of the public C/A code to provide an estimated server C/A code time synchronization.

The server C/A code generator 544 generates the known (P) code based on the estimated server C/A code time synchronization to provide the estimated server known (P) code.

The server C/A code generator 544 and the server C/A delay estimator 548 together enable tracking of the C/A code in a usual fashion well known to those skilled in the art. The server C/A code generator 544 and the server C/A delay estimator 548 are also used to synchronize the server P code generator 552. P code synchronization also makes use of data in the navigation message from the satellites 102-106. This data can be accessed based on the C/A code tracking.

The server P code generator 552 is configured to estimate an estimated server known (P) code 554 (estimated server known high rate code) based on the server received coded satellite signal 530.

The server P×Y multiplier 558 is configured to extract an estimated server unknown (W) code signal 560 from the server received coded satellite signal 530 based on the estimated server known (P) code 554. The server P×Y multiplier 558 removes the estimated server known (P) code from the encrypted P(Y) code of the server received encrypted P(Y) code satellite signal to provide the estimated server unknown (W) code signal.

The server $BPF_w$ 564 is configured to band-pass filter the estimated server unknown (W) code signal 560 at a bandwidth of 1 MHz or less. This filtering is performed prior to the W×W multiplication at the server W code multiplier 568. Thus noise in the W×W multiplication is greatly reduced prior to averaging at the integrator 572 and the authentication response module 576. This noise reduction mitigates the squaring loss described earlier.

The server W code multiplier 568 is configured to multiply the estimated client unknown (W) code signal 590 by the estimated server unknown (W) code signal 560 to provide the W×W multiplication at the server W code multiplier 568.

The integrator 572 (averager) is configured to compare the estimated client unknown (W) code signal 590 to the estimated server unknown (W) code signal 560 to provide a unknown (W) code comparison result 574.

The authentication response module 576 makes an authentication decision such as the authentication decision message 144 (FIG. 1) based on the unknown (W) code comparison result 574. In some embodiments, the authentication response module 576 is located in the authentication module 534 in the server 112. In other embodiments, the authentication response module 576 is located in the gateway 150 or a host network 152 (FIG. 1). For example, an authentication server may compute geolocation information and provide an authentication response message to a host network that the host network than uses its own policy module to make an authentication decision. The client device is allowed access to a protected resource if the location of the client device is valid, and the client device is not allowed access to the protected resource if the location of the client device is invalid.

The server P×Y multiplier 558 utilizes the C/A code 536 from the C/A code generator 544, because the C/A code 536 and the estimated server known (P) code 554 are synchronized. The server P×Y multiplier 558 may also utilize data in the navigation message from the satellites 102-106 to help with the synchronization process (not shown). When a synchronized server P code 554 multiplies the server received coded satellite signal 530, the following product exists for each of the satellites 102-106, P×Y=P×(W×P)= $P^2$×W=W. This product is afflicted by natural noise and interference from the other satellite signals.

The server P×Y multiplier 558 extracts an estimated server unknown (W) code signal 560 from the server received coded satellite signal 530 based on the estimated server known (P) code 554. The W code chipping rate is only 0.5 Mcps, and so the null-to-null bandwidth is 1 MHz. Hence, the client band-pass filter $BPF_w$ 592 and the server band-pass filter $BPF_w$ 564 need only have a bandwidth of 1 MHz or less. This filtering is performed prior to the W×W multiplication by the server W code multiplier 568. Thus, noise in the W×W multiplication in the server W code multiplier 568 is greatly reduced prior to averaging at the integrator 572 and prior to making an authentication decision at the authentication response module 576.

The authentication module 534 further comprises a client C/A code generator 580, a client C/A delay estimator 582, a client C/A×C/A multiplier 584, a client P code generator 586, the client P×Y multiplier 588, the client band-pass filter $BPF_w$ 592, and a client delay 598.

The server 112 may comprise one server P code generator 550 for each server received coded satellite signal 530, and one P code generator 586 for each client received coded satellite signal 138. There may be thousands or even millions of clients delivering their signatures such as the client signature 138 to a given authentication server such as the authentication server 112. Thus, server operations described herein may be distributed over many servers.

The client P code generator 586 is synchronized with an incoming P code from the client device 108 by the C/A delay estimator 582 tracking an arrival time of the C/A code 404 and combining this information with timing information in the messages from the satellites 102-106.

A P code replica generated by the client P code generator 586 multiplies an incoming radio signal such as the client signature 138 (e.g., in client P×Y multiplier 588), and this process is widely known as P code wipeoff.

The client C/A delay estimator 548 estimates a time synchronization of the public C/A code to provide an estimated client C/A code time synchronization 546.

The client C/A code generator 580 contributes to generating the known (P) code based on the estimated client C/A code time synchronization to provide the estimated client known (P) code 542 (estimated client known high rate code).

The client P code generator 586 is configured to estimate an estimated client known (P) code 594 based on the client received coded satellite signal 138.

The client P×Y multiplier 588 is configured to extract an estimated client unknown (W) code signal 590 from the client received coded satellite signal 138 based on the estimated client known (P) code 594. The client P×Y multiplier 588 removes the estimated client known (P) code 594 from the encrypted P(Y) code of the client received encrypted P(Y) code signal (comprises in the client received coded satellite signal 138) to provide the estimated client unknown (W) code signal 590.

The client band-pass filter $BPF_w$ 592 is configured to band-pass filter the estimated client unknown (W) code signal 590 at a bandwidth of 1 MHz or less. This filtering is performed prior to the W×W multiplication by the server W code multiplier 568. Thus the noise in the W×W multiplication is greatly reduced prior to averaging at the integrator 572 and authenticating at the authentication response module 576.

The server W code multiplier 568 is configured to multiply the estimated client unknown (W) code signal 590 by the estimated client unknown (W) code signal 560.

The client P×Y multiplier 588 utilizes the C/A code 542 from the C/A code generator 580 because the C/A code 542 and the estimated client known (P) code 594 (synchronized client (P) code 594) are synchronized. The client P×Y multiplier 588 may also utilize data in the navigation messages from the satellites 102-106 to help with the synchronization process (not shown). When a synchronized client P code 594 multiplies the client received coded satellite signal 138, the following product exists for each of the satellites 102-106, P×Y=P×(W×P)=P$^2$×W=W. This product is also afflicted by natural noise and interference from the other satellite signals, but the essential purpose is clear: the client P×Y multiplier 588 extracts an estimated client unknown (W) code signal 590 from the client received coded satellite signal 138 based on the estimated client known (P) code 594.

As mentioned above, the W code chipping rate is only 0.5 Mcps, and so the null-to-null bandwidth is 1 MHz. Hence the client band-pass filter BPF$_w$ 592 and the client band-pass filter BPF$_w$ 564 need only have a bandwidth of 1 MHz or less. This filtering is performed prior to the server W×W multiplication 568. Thus, noise in the W×W multiplication in the server W code multiplier 568 is greatly reduced prior to averaging at the integrator 572 and the authentication response module 576.

Processor modules 512/538 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 512/538 comprise processing logic that is configured to carry out the functions, techniques, and processing tasks associated with the operation of the system 500.

In particular, the processing logic is configured to support the authentication method described herein. For, example the client processor module 512 may be suitably configured to send the client signature set 138 from the client device 108 to the authentication server 112 via a client transmit antenna (not shown). For another example, the server processor module 538 may be suitably configured to send the authentication decision message 144 made by the authentication response module 576 to another server or to the client device 108 via a server transmit antenna (not shown). Furthermore, the steps of a method or algorithm described in connection with the embodiments disclosed herein may be embodied directly in hardware, in firmware, in a software module executed by processor modules 512/538, or in a combination thereof.

The memory modules 514/540, may be realized as a non-volatile storage device (non-volatile semiconductor memory, hard disk device, optical disk device, and the like), a random access storage device (for example, SRAM, DRAM), or any other form of storage medium known in the art. The memory module 908/934 may be coupled to the processor modules 512/538 respectively such that the processor modules 512/538 can read information from, and write information to, memory modules 514/540.

As an example, the processor module 512 and memory module 514, the processor module 538 and the memory module 540 may reside in their respective ASICs. The memory modules 514 and 540 may also be integrated into the processor modules 512 and 538 respectively. In an embodiment, the memory module 908/934 may include a cache memory for storing temporary variables or other intermediate information during execution of instructions to be executed by processor modules 512/538. The memory modules 514/540 may also include non-volatile memory for storing instructions to be executed by the processor modules 512/538.

For example, the memory modules 514/540 may include a location database (not shown) for storing the client signature 138, and other data in accordance with an embodiment of the disclosure. Those skilled in the art will understand that the various illustrative blocks, modules, circuits, and processing logic described in connection with the embodiments disclosed herein may be implemented in hardware, computer-readable software, firmware, or a combination thereof. To clearly illustrate this interchangeability and compatibility of hardware, firmware, and software, various illustrative components, blocks, modules, circuits, and steps are described generally in terms of their functionality.

Figure 6:
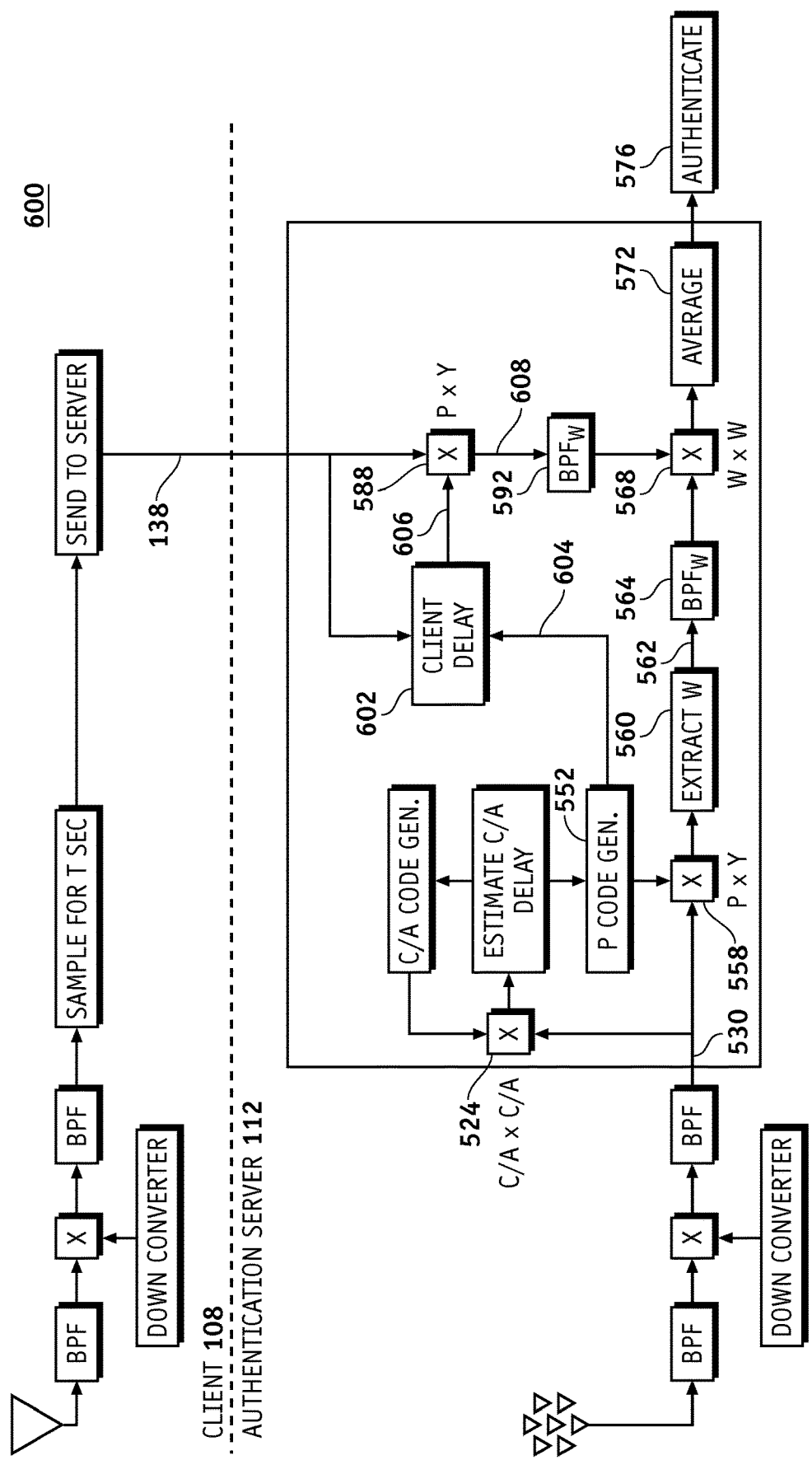
FIG. 6 is an illustration of an exemplary functional block diagram of an authentication system showing code wipeoff of client data and server data at an authentication server according to an embodiment of the disclosure.

FIG. 6 is an illustration of an exemplary functional block diagram of an authentication system 600 (system 600) showing code wipeoff of client data and server data at an authentication server according to an embodiment of the disclosure. System 600 may have functions, material, and structures that are similar to the embodiments shown in FIG. 5. Therefore common features, functions, and elements may not be redundantly described here. Similar to system 500, system 600 moves the P code wipeoff to the server 112 and still builds a W×W product as part of the correlation process as explained above.

System 600 utilizes fewer P code generators than system 500. System 600 comprises one server P code generator 552 for each of the satellites 102-104 in view of the server 112. The P code replica(s) 606 needed for correlation with the client signature(s) 138 are created by delaying the estimated client known P code signal 604 generated by the server P code generator 552. The estimated client known P code signal 604 is delayed at the client delay 602 to provide the P code replica(s) 606. In both systems 500 and 600, a pre-correlation bandwidth prior to the W×W multiplication at the server W code multiplier 568 (W code wipe-off) is reduced to 1 MHz or less. Thus the client band-pass filter BPF$_w$ 592 and the server band-pass filter BPF$_w$ 564 need only have a bandwidth of 1 MHz or less. This filtering is performed prior to noise in the W×W multiplication at the server W code multiplier 568.

The client delay 602 estimates a client C/A code time synchronization based on the client received coded satellite signal 138, and estimates the estimated client known (P) code comprising the estimated server known (P) code synchronized to the client C/A code time synchronization.

Figure 7:
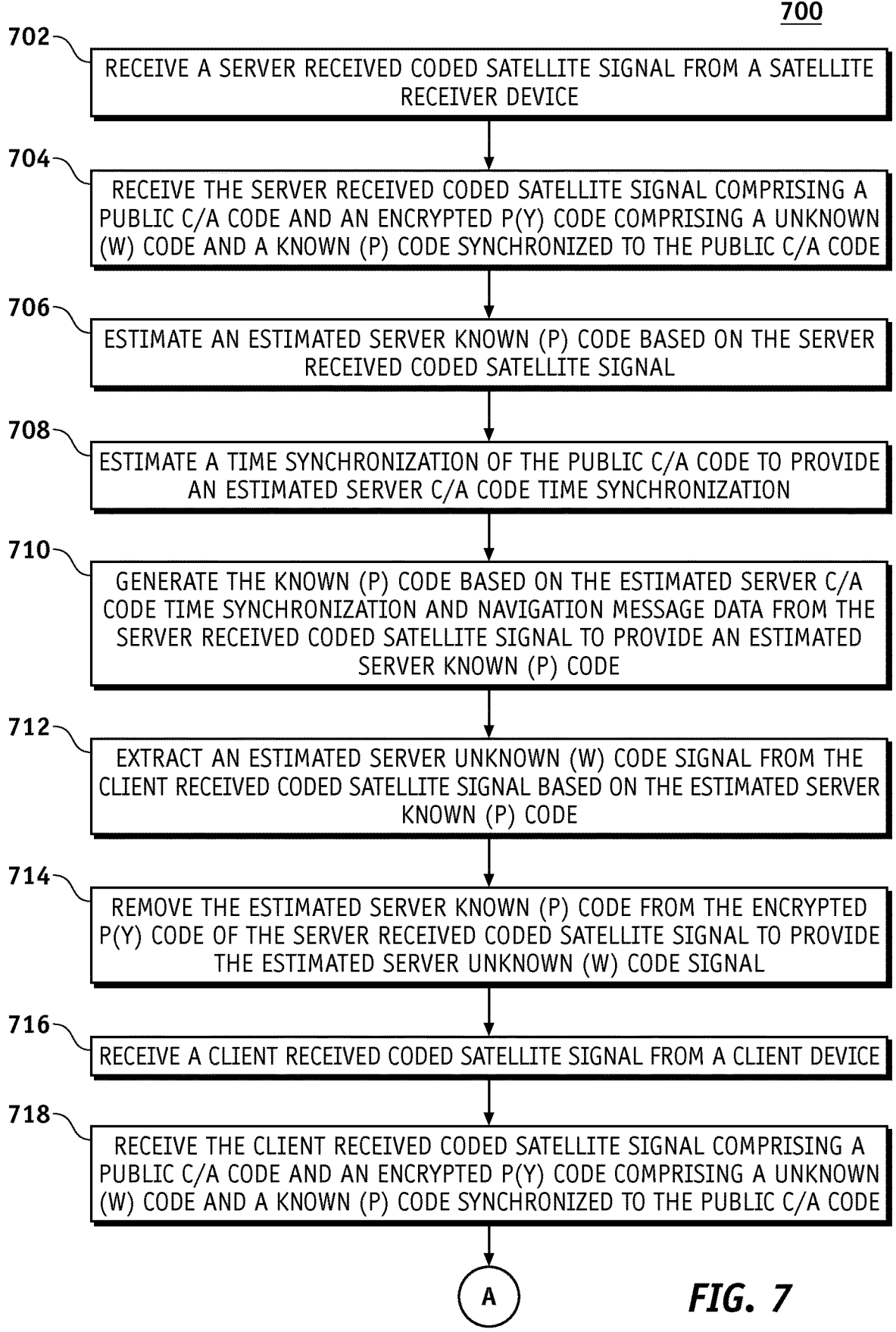
FIG. 7 is an illustration of an exemplary flowchart showing an authentication process for code wipeoff of client data and server data at an authentication server that can be performer by the authentication system of FIGS. 5 and 6 according to an embodiment of the disclosure.
Figure 7:
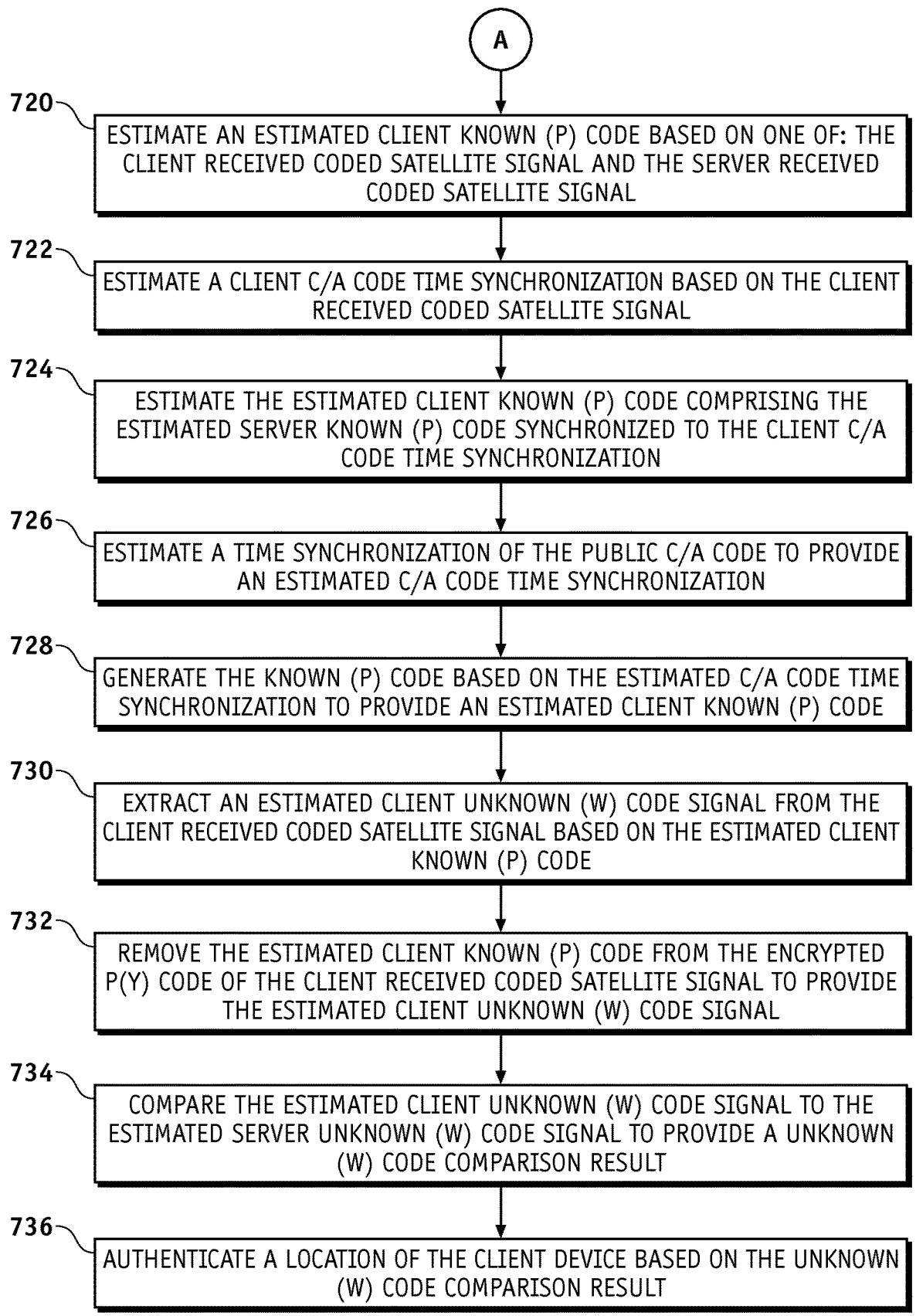

FIG. 7 is an illustration of an exemplary flowchart showing an authentication process 700 for code wipeoff of client data and server data at an authentication server that can be performer by the authentication system of FIGS. 5 and 6 according to an embodiment of the disclosure. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the processor module 512/538 in which the computer-readable medium is stored.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In some embodiments, portions of the process 700 may be performed by different elements of the systems 500 and 600 such as: the client device 108, the authentication server 112, etc. Process 700 may have functions, material, and structures that are similar to the embodiments shown in FIGS. 1-12. Therefore common features, functions, and elements may not be redundantly described here.

Process 700 may begin by receiving a server received coded satellite signal (148) from a satellite receiver device (task 702).

Process 700 may continue by receiving the server received coded satellite signal comprising a public C/A code (public code) and an encrypted P(Y) code (encrypted code) comprising (a product of) a unknown (W) code (unknown low-rate code) and a known (P) code (known high-rate code) synchronized to the public C/A code (public code) (task 704).

Process 700 may continue by estimating an estimated server known high rate code such as the code estimated server known (P) code 554 based on the server received coded satellite signal 148 (task 706).

Process 700 may continue by estimating a time synchronization of the public C/A code (public code) to provide an estimated server C/A code time synchronization (estimated server code time synchronization) (task 708).

Process 700 may continue by generating the known (P) code (known high-rate code) based on the estimated server C/A code time synchronization and navigation message data from the server received coded satellite signal to provide the estimated server known (P) code (task 710).

Process 700 may continue by extracting an estimated server unknown (W) code signal (estimated client unknown low-rate code signal) from the client received coded satellite signal based on the estimated server known high-rate (P) code (task 712).

Process 700 may continue by removing the estimated server known high-rate (P) code from the encrypted P(Y) code of the server received coded satellite signal to provide the estimated server unknown low-rate (W) code signal (task 714).

Process 700 may continue by receiving a client received coded satellite signal from a client device (task 716).

Process 700 may continue by (FIG. 5) receiving the client received coded satellite signal comprising a public C/A code (public code) and an encrypted P(Y) code (encrypted code) comprising (a product of) a unknown (W) code (unknown low-rate code) and a known (P) code (known high-rate code) synchronized to the public C/A code (public code) (task 718).

Process 700 may continue by estimating an estimated client known high rate code such as the estimated client known (P) code 542 based on one of: the client received coded satellite signal and the server received coded satellite signal (task 720).

Process 700 may continue by (FIG. 6) estimating a client C/A code (public code) time synchronization (client code time synchronization) based on the client received coded satellite signal (task 722).

Process 700 may continue by (FIG. 6) estimating the estimated client known (P) code (estimated client known high-rate code) comprising the estimated server known (P) code (estimated server known high-rate code) synchronized to the client C/A code time synchronization (task 724).

Process 700 may continue by (FIG. 5) estimating a time synchronization of the public C/A code (public code) to provide an estimated C/A code time synchronization (task 726).

Process 700 may continue by (FIG. 5) generating the known (P) code (known high-rate code) based on the estimated C/A code time synchronization to provide an estimated client known (P) code (estimated client known high-rate code) (task 728).

Process 700 may then continue by extracting an estimated client unknown (W) code signal (estimated client unknown low-rate code signal) from the client received coded satellite signal based on the estimated client known (P) code (estimated client known high-rate code) (task 730).

Process 700 may continue by (FIG. 5) removing the estimated client known (P) code (estimated client known high-rate code) from the encrypted P(Y) code of the client received coded satellite signal to provide the estimated client unknown (W) code signal (estimated client unknown low-rate code signal) (task 732).

Process 700 may continue by comparing the estimated client unknown (W) code signal (estimated client unknown low-rate code signal) to the estimated server unknown (W) code signal (estimated server unknown low-rate code signal) to provide a unknown (W) code comparison result (unknown low-rate code comparison result) (task 734).

Process 700 may continue by authenticating a location of the client device based on the unknown (W) code comparison result (unknown low-rate code comparison result) (task 736).

Figure 8:
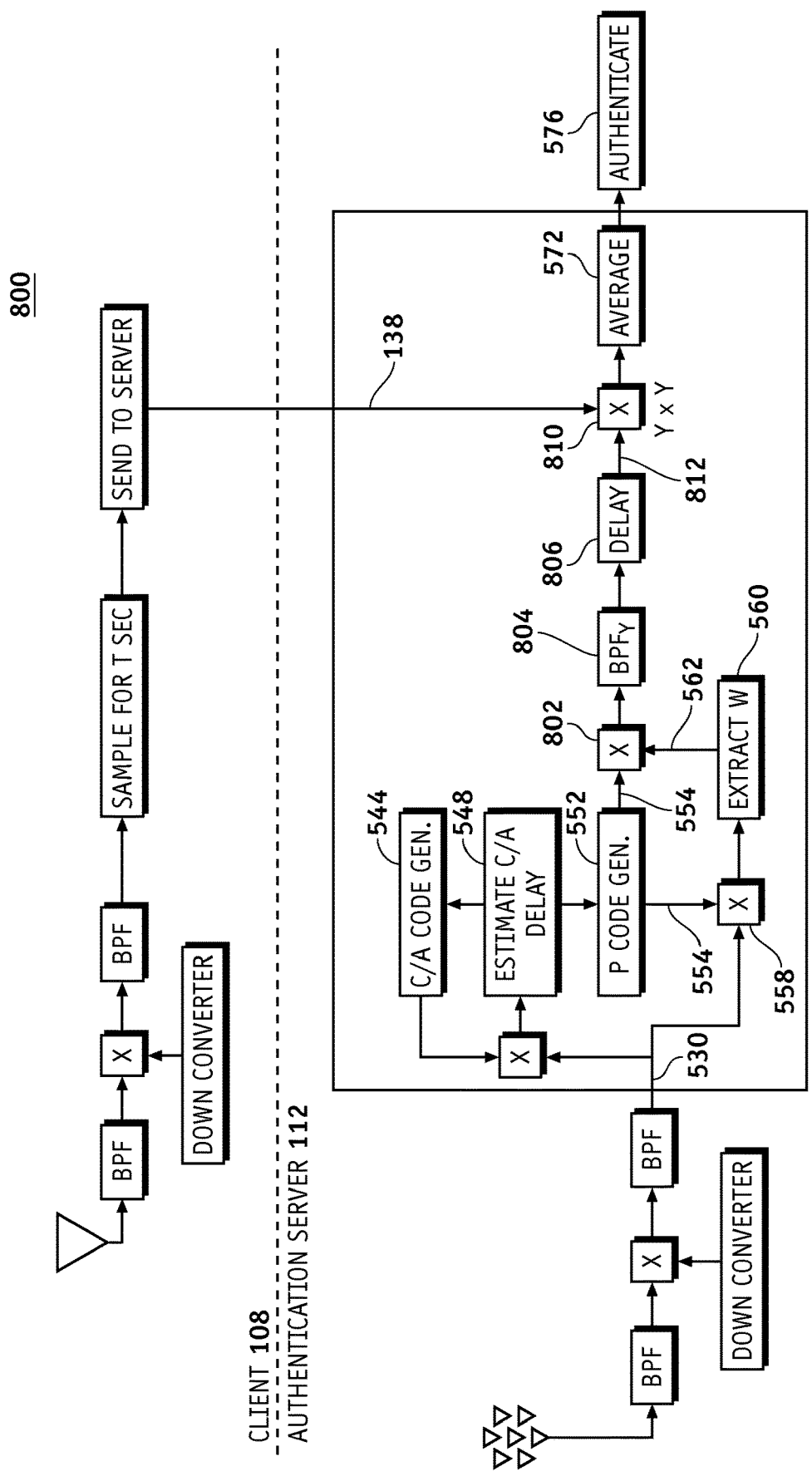
FIG. 8 is an illustration of an exemplary functional block diagram of an authentication system showing a rebuild of a Y code at an authentication server according to an embodiment of the disclosure.

FIG. 8 is an illustration of an exemplary functional block diagram of an authentication system 800 (system 800) that rebuilds the Y code 408 at the authentication server 112 according to an embodiment of the disclosure. System 800 may have functions, material, and structures that are similar to the embodiments shown in FIGS. 5-6. Therefore common features, functions, and elements may not be redundantly described here.

Compared to system 500-600, system 800 does not include the W code multiplier 568. Rather the system 800 comprises a Y×Y multiplication 810. However, system 800 does make use of the Y=W×P to rebuild a low noise estimate of the Y code 408 signal at the server 112. The server received coded satellite signal 530 are used to estimate an arrival time of the C/A codes 404. The server C/A code generator 544 and the server C/A delay estimator 548 together enable tracking of the C/A code 404 by various methods such methods known to those skilled in the art. They are also used to synchronize the server P code generator 552. P code synchronization also makes use of data in the navigation message from the satellites 102-106. This data can be accessed, because C/A code tracking enables the server 112 to demodulate navigation messages from the satellites 102-106.

The estimated server known (P) code 554 is wiped-off the incoming server received coded satellite signal 530 at the server P×Y multiplier 558 to approximate an operation W=P×(P×W), which holds when the P codes 404 are synchronized. An estimated client unknown (W) code signal 560/562 is estimated by averaging the P code 404 data for intervals that correspond to the W code 410 chip duration of 2 microseconds. An estimated server encrypted P(Y) code signal 812 is estimated by a multiplier 802 multiplying the server unknown (W) code signal 560/562 with the generated known (P) code signal 554. This process constructs the estimated server encrypted P(Y) code signal 812 as a low noise Y code replica to be used in the server's 112 authentication process.

The estimated server encrypted P(Y) code signal 812 signal has low noise compared to received Y code signals in the client received coded satellite signal 138, because the signals from other satellites do not appear in the estimated server encrypted P(Y) code signal 812. Importantly, the estimated server encrypted P(Y) code signal 812 does not have the C/A codes 404 from the other satellites. This cleanliness is important, because a C/A code receiver at the server 112 will correlate with the C/A codes 404 in the client received coded satellite signal 138 and create troublesome C/A code artifacts. The estimated server encrypted P(Y) code signal 812 also leverages the known P code 412 to reduce natural noise.

Figure 9:
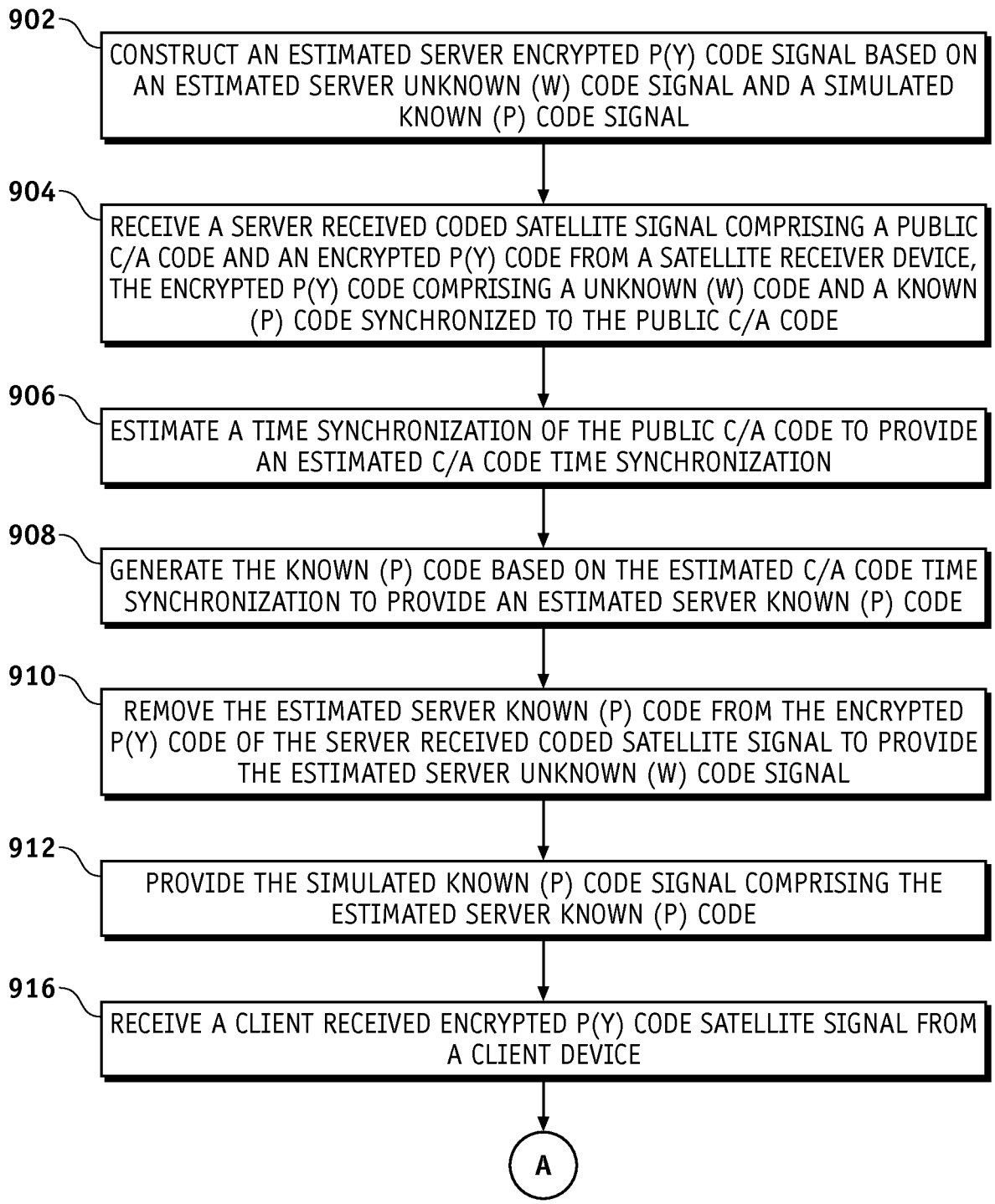
FIG. 9 is an illustration of an exemplary flowchart showing an authentication process for rebuilding P(Y) code at an authentication server that can be performer by the authentication system of FIG. 8 according to an embodiment of the disclosure.
Figure 9:
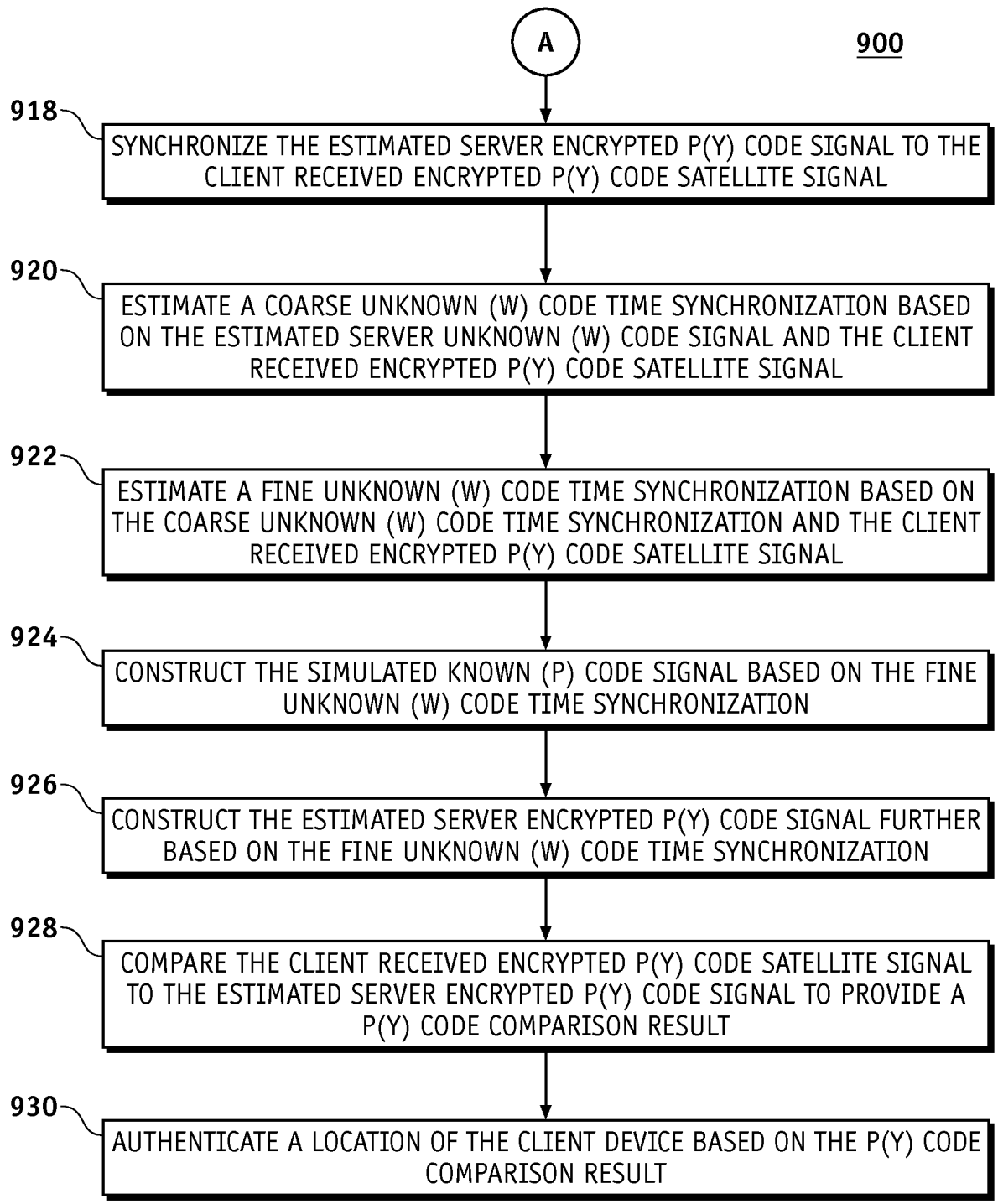

FIG. 9 is an illustration of an exemplary flowchart showing an authentication process 900 for rebuilding P(Y) code at an authentication server that can be performed by the authentication system 800 and 1000 according to an embodiment of the disclosure. The various tasks performed in connection with the process 900 may be performed by software, hardware, firmware, a computer-readable medium having computer executable instructions for performing the process method, or any combination thereof. The process 900 may be recorded in a computer-readable medium such as a semiconductor memory, a magnetic disk, an optical disk, and the like, and can be accessed and executed, for example, by a computer CPU such as the processor module 512/538 in which the computer-readable medium is stored.

It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein. In some embodiments, portions of the process 900 may be performed by different elements of the systems 500 and 600 such as: the client device 108, the authentication server 112, etc. Process 900 may have functions, material, and structures that are similar to the embodiments shown in FIGS. 1-12. Therefore common features, functions, and elements may not be redundantly described here.

Process 900 may begin by constructing an estimated server encrypted P(Y) code signal (estimated server unknown high-rate encrypted code signal) based on an estimated server unknown (W) code signal (estimated server unknown low-rate code signal) and a generated known (P) code signal (generated known high-rate code signal) (task 902).

Process 900 may continue by receiving a server received (unknown high-rate) coded satellite signal comprising a public C/A code (public code) and an encrypted P(Y) code (encrypted code) from a satellite receiver device, the encrypted P(Y) code (encrypted code) comprising (a product of) a unknown (W) code (unknown low-rate code) and a known (P) code (known high-rate code) synchronized to the public C/A code (public code) (task 904).

Process 900 may continue by estimating a time synchronization of the public C/A code (public code) to provide an estimated C/A code time synchronization (estimated code time synchronization) (task 906).

Process 900 may continue by generating the known (P) code (known high-rate code) based on the estimated C/A code time synchronization and navigation message data from the server received coded satellite signal to provide an estimated server known (P) code (estimated server known high-rate code) (task 908).

Process 900 may continue by removing the estimated server known (P) code (estimated server known high-rate code) from the encrypted P(Y) code of the server received coded satellite signal to provide the estimated server unknown (W) code signal (estimated server unknown low-rate code signal) (task 910).

Process 900 may continue by (FIG. 8) providing the generated known (P) code signal (generated known high-rate code signal) comprising the estimated server known (P) code (estimated server known high-rate code) (task 912).

Process 900 may continue by (FIG. 8) filtering the estimated server encrypted P(Y) code signal (estimated server unknown high-rate encrypted code signal) (task 914).

Process 900 may continue by receiving a client received encrypted P(Y) code satellite signal (client received unknown high-rate encrypted code satellite signal) from a client device (task 916).

Process 900 may continue by synchronizing the estimated server encrypted P(Y) code signal (estimated server unknown high-rate encrypted code signal) to the client received encrypted P(Y) code satellite signal (client received unknown high-rate encrypted code satellite signal) (task 918).

Process 900 may continue by (FIG. 10) estimating a coarse unknown (W) code time synchronization (coarse unknown low-rate code time synchronization) based on the estimated server unknown (W) code signal (estimated server unknown low-rate code signal) and the client received encrypted P(Y) code satellite signal (client received unknown high-rate encrypted code satellite signal) (task 920).

Process 900 may continue by (FIG. 10) estimating a fine unknown (W) code time synchronization (fine unknown low-rate code time synchronization) based on the coarse unknown (W) code time synchronization (coarse unknown low-rate code time synchronization) and the client received encrypted P(Y) code satellite signal (client received unknown high-rate encrypted code satellite signal) (task 922).

Process 900 may continue by (FIG. 10) constructing the generated known (P) code signal (generated known high-rate code signal) based on the fine unknown (W) code time synchronization (fine unknown low-rate code time synchronization) (task 924).

Process 900 may continue by (FIG. 10) constructing the estimated server encrypted P(Y) code signal (estimated server unknown high-rate encrypted code signal) further based on the fine unknown (W) code time synchronization (fine unknown low-rate code time synchronization) (task 926).

Process 900 may continue by comparing the client received encrypted P(Y) code satellite signal (client received unknown high-rate encrypted code satellite signal) to the estimated server encrypted P(Y) code signal (estimated server unknown high-rate encrypted code signal) to provide a P(Y) code comparison result (task 928).

Process 900 may continue by authenticating a location of the client device based on the P(Y) code comparison result (task 930). In some embodiments, the client device 108 is allowed access to a protected resource if the location 122 of the client device 108 is valid, and the client device 108 is not allowed access to the protected resource if the location 122 of the client device 108 is invalid. The protected resource may comprise, for example but without limitation, a network, resource on a network, resource like a piece of hardware not locally controlled, or other resource. In some embodiments, an invalid result may direct the client device 108 to attention of law enforcement, a honeypot, or other action.

Figure 10:
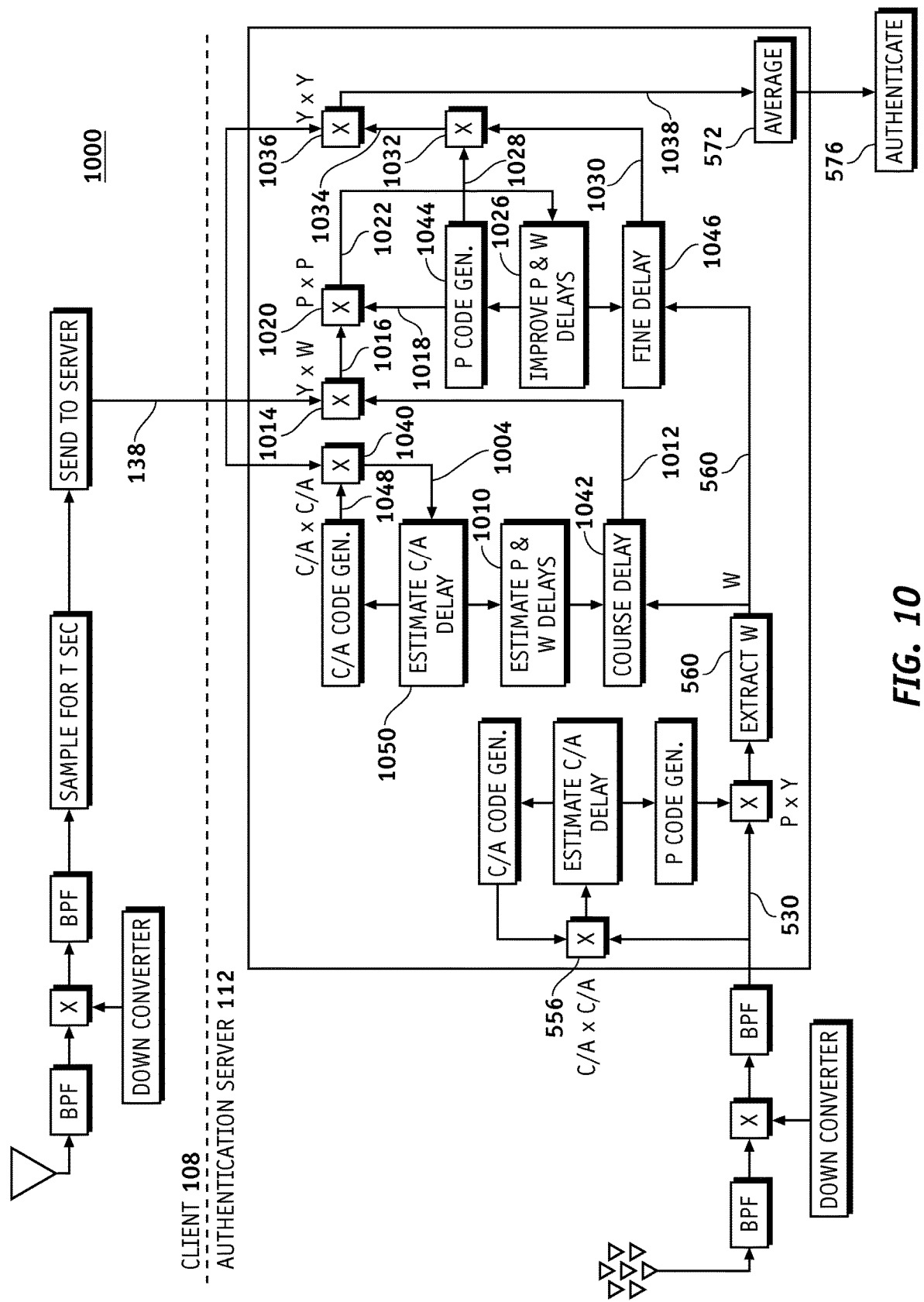
FIG. 10 is an illustration of an exemplary functional block diagram of an authentication system showing code wipeoff of client data and server data at an authentication server according to an embodiment of the disclosure.

FIG. 10 is an illustration of an exemplary functional block diagram of an authentication system 1000 (system 1000) showing code wipeoff of client data and server data at the authentication server 112 according to an embodiment of the disclosure. System 1000 may have functions, material, and structures that are similar to the embodiments shown in FIGS. 5, 6 and 8. Therefore common features, functions, and elements may not be redundantly described here.

Similar to the systems 500, 600 and 800, measurements of the server received signals 148 from the (high gain) server antenna 114 are used to estimate the estimated server unknown (W) code signal 560 as received at the server antenna 114.

Simultaneously, the C/A code 404 is recovered from the client received coded satellite signal 138 by a client C/A× C/A operation 1040 to provide a C/A estimate 1004. The C/A estimate 1004 is used to estimate a coarse unknown (W) code time synchronization 1010 (time alignment) of the W code chips in the client received coded satellite signal 138. The coarse unknown (W) code time synchronization 1010 is used by a course delay module 1042 to coarsely delay the estimated server unknown (W) code signal 560 from the server 112 to provide a coarsely aligned W code 1012.

The coarsely aligned W code 1012 from the server 112 multiplies the client received coded satellite signal 138 at the Y×W multiplier 1014 to provide a generated server known (P) code 1016 (The product Y×W is approximately equal to the P code). The simulated server known (P) code 1016 is correlated with the server P code replica 1018 generated by the P code generator 1044 to provide a P×P correlation signal 1022. The relevant wipe-off operation is the P×P operation 1020.

A fine unknown (W) code time synchronization 1030 is estimated based on the coarse unknown (W) code time synchronization 1010 and the client received encrypted P(Y) code satellite signal. The P×P correlation signal 1022 is used by the P&W delay improvement module 1026 to improve an alignment of the server P code replica 1018 with the P code in the client received coded satellite signal 138 to provide a finely aligned P code 1028.

The P×P correlation signal 1022 is also used by the P&W delay improvement module 1026 to improve an alignment of the estimated server unknown (W) code signal 560 with the W code 410 in the client received coded satellite signal 138 to provide a finely aligned W code 1030.

The finely aligned P code 1028 is multiplied by the finely aligned W code 1030 at the multiplier 1032 to provide a final replica of the Y code 1034 used by the server 112. The final replica of the Y code 1034 is correlated with the client received coded satellite signal 138 at a Y×Y multiplier 1036 to provide a Y×Y product 1038. The Y×Y product 1038 is averaged at the integrator 572 to accumulate a decision statistic for an authentication decision in the authentication decision message 144 made by the authentication response module 576.

Figure 11:
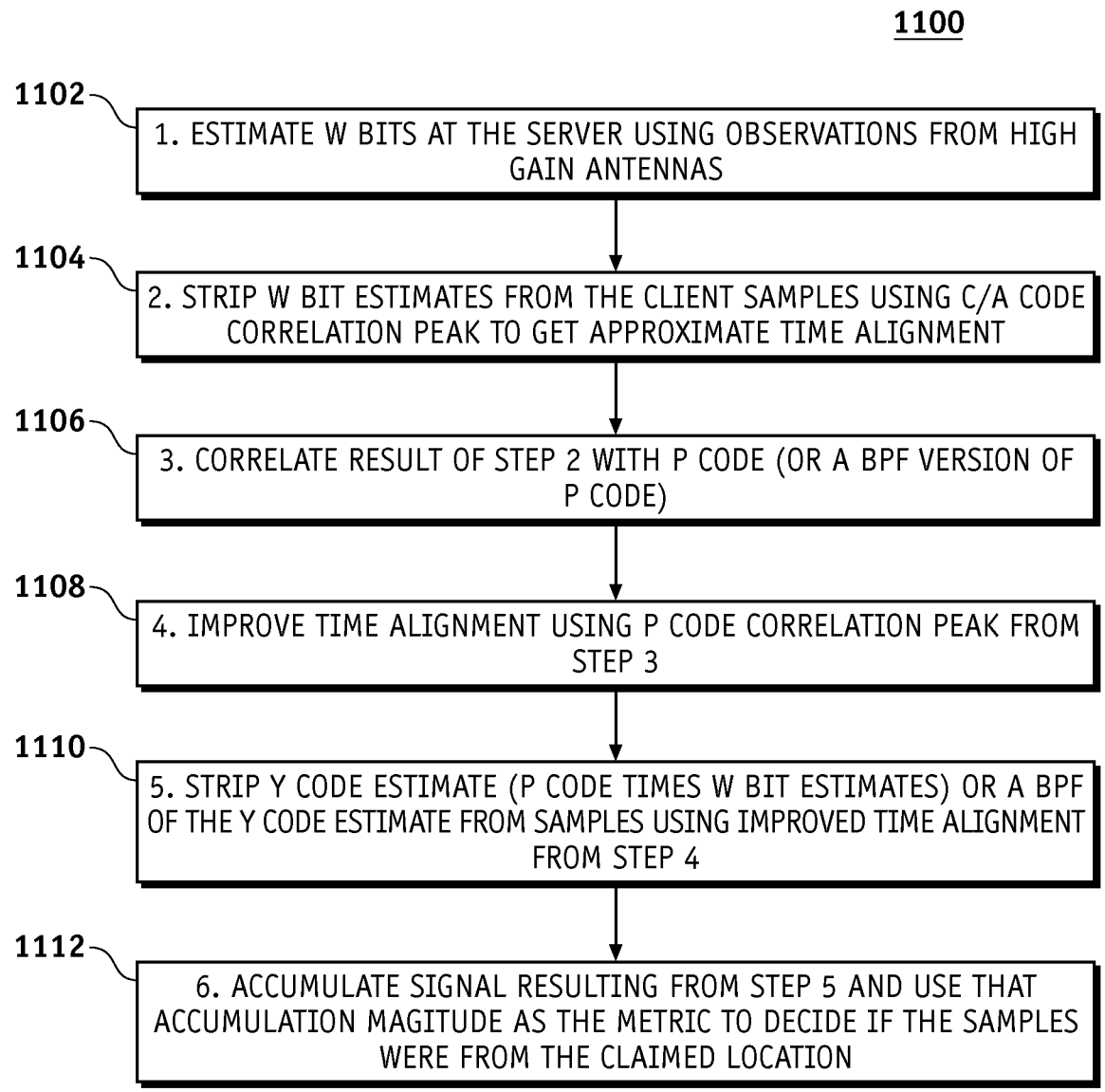
FIG. 11 is an illustration of an exemplary flowchart showing an authentication process that can be performed by the authentication system of FIG. 10 according to an embodiment of the disclosure.

FIG. 11 is an illustration of an exemplary flowchart showing an authentication process 1100 that can be performed by the authentication system of FIG. 10 according to an embodiment of the disclosure.

Process 1100 may begin by estimating the estimated server unknown (W) code signal 560 as received at the server antenna 114 (task 1102). Similar to the systems 500, 600 and 800, measurements of the server received signals 148 from the (high gain) server antenna 114 are used to estimate the estimated server unknown (W) code signal 560 as received at the server antenna 114.

Process 1100 may continue by estimating a coarse unknown (W) code time synchronization 1010 (time alignment) of the W code chips in the client received coded satellite signal 138 (task 1104). Process 1100 simultaneously with task 1102 recovers the C/A code 404 from the client received coded satellite signal 138 by a client C/A×C/A multiplier 584 operation to provide a C/A estimate 1004. The C/A estimate 1004 is used to estimate a coarse unknown (W) code time synchronization 1010 (time alignment) of the W code chips in the client received coded satellite signal 138. The coarse unknown (W) code time synchronization 1010 is used to coarsely delay the estimated server unknown (W) code signal 560 from the server 112 to provide a coarsely aligned W code 1012.

Process 1100 may continue by correlating the simulated server known (P) code 1016 with the server P code replica 1018 generated by the P code generator 586 to provide a P×P correlation signal 1022 (task 1106). The coarsely aligned W code 1012 from the server 112 multiplies the client received coded satellite signal 138 at the Y×W multiplier 1014 to provide a simulated server known (P) code 1016 (The product Y×W is approximately equal to the P code). The simulated server known (P) code 1016 is correlated with the server P code replica 1018 generated by the P code generator 586 to provide a P×P correlation signal 1022. The relevant wipe-off operation is the P×P operation 1020.

Process 1100 may continue by improving time alignment using P×P the correlation signal 1022 (correlation peak) (task 1108). A fine unknown (W) code time synchronization 1030 is estimated based on the coarse unknown (W) code time synchronization 1010 and the client received encrypted P(Y) code satellite signal. The P×P correlation signal 1022 is used by the P&W delay improvement module 1026 to improve an alignment of the server P code replica 1018 with the P code in the client received coded satellite signal 138 to provide a finely aligned P code 1028.

Process 1100 may continue by removing the estimated server encrypted P(Y) code signal further based on the fine unknown (W) code time synchronization (task 1110). The P×P correlation signal 1022 is also used by the P&W delay improvement module 1026 to improve an alignment of the estimated server unknown (W) code signal 560 with the W code 410 in the client received coded satellite signal 138 to provide a finely aligned W code 1030.

Process 1100 may continue by making an authentication decision (task 1112). The finely aligned P code 1028 is multiplied by the finely aligned W code 1030 at the multiplier 1032 to provide a final replica of the Y code 1034 used by the server 112. The final replica of the Y code 1034 is correlated with the client received coded satellite signal 138 at a Y×Y multiplier 1036 to provide a Y×Y product 1038. The Y×Y product 1038 is averaged at the integrator 572 to accumulate a decision statistic for an authentication decision in the authentication decision message 144 made by the authentication response module 576.

In some embodiments, the client device 108 is allowed access to a protected resource if the location 122 of the client device 108 is valid, and the client device 108 is not allowed access to the protected resource if the location 122 of the client device 108 is invalid. The protected resource may comprise, for example but without limitation, a network, resource on a network, resource like a piece of hardware not locally controlled, or other resource. In some embodiments, an invalid result may direct the client device 108 to attention of law enforcement, a honeypot, or other action.

Figure 12:
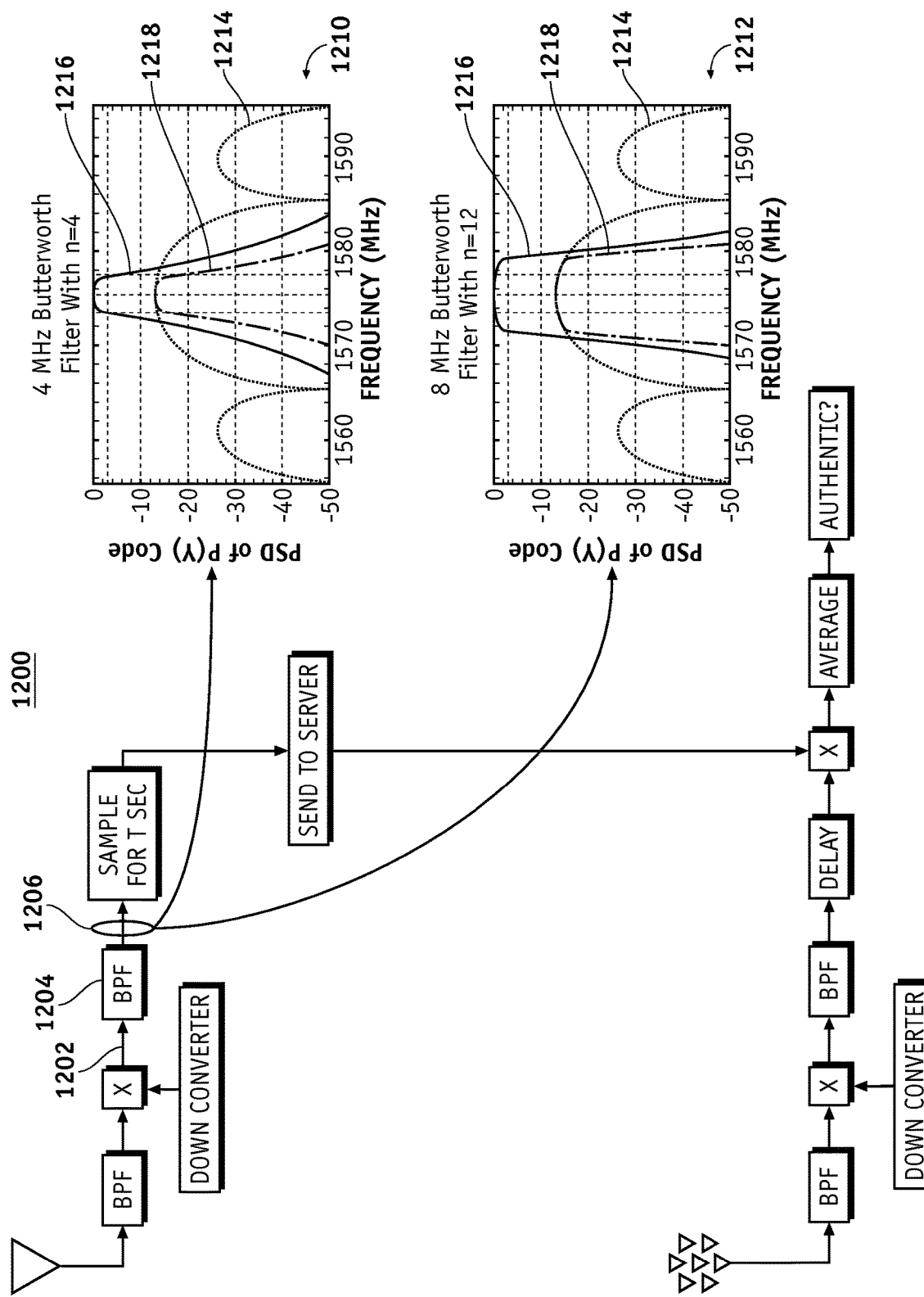
FIG. 12 is an illustration of an exemplary functional block diagram of an authentication system showing an impact of a client band-pass filter (BPF) on waveform from a client to a server in a frequency domain.

FIG. 12 is an illustration of an exemplary functional block diagram of an authentication system 1200 (system 1200) showing an impact of a client band-pass filter (BPF) 1204 on waveform from the client device 108 to the server 112 in a frequency domain. An important problem in GPS-based authentication is that a bandwidth of client equipment is generally smaller than a bandwidth of the Y code 408. This issue is depicted in FIG. 12, with a worrisome band-pass filter 1204 in the client equipment. In fact, the most narrow band-pass filter (BPF) can occur anywhere in the client processing chain.

Plots 1210 and 1212 compare typical filter pass bands to the bandwidth of the P(Y) code 408. In both plots 1210 and 1212, the curves 1214 are the P(Y) power spectral density (PSD) at the BPF 1204 input 1202. Curves 1216 show the filter pass bands, and curves 1218 show the P(Y) power spectral densities at the filter output 1206 of the BPF 1204. The plot 1210 is for a filter with a two-sided bandwidth of only 4 MHz, and the output PSD is much narrower than the input PSD. The plot 1212 is for a filter with a two-sided bandwidth of 8 MHz, and the impact on the PSD is still significant.

Figure 13:
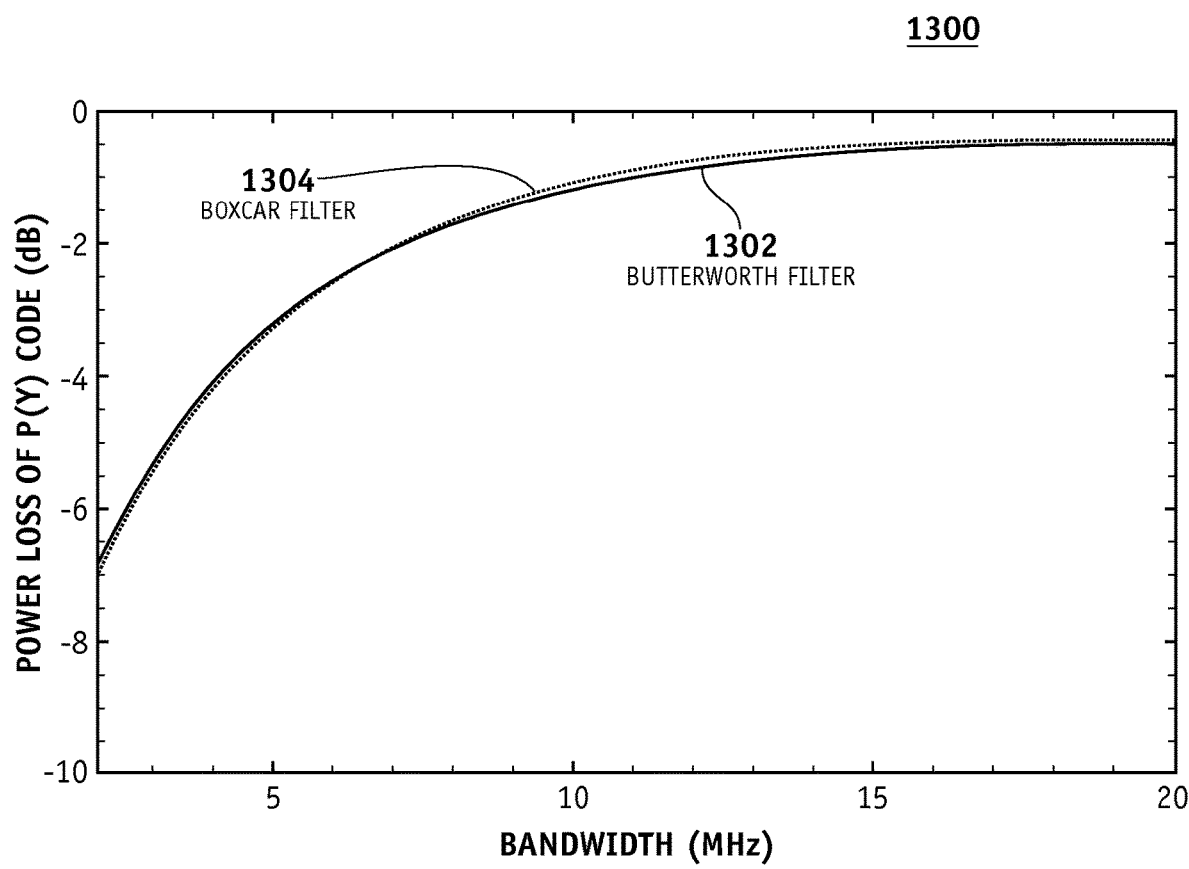
FIG. 13 is an illustration of an exemplary diagram showing P(Y) code power loss due to narrowband filtering at client device versus bandwidth.

FIG. 13 is an illustration of an exemplary diagram showing P(Y) code power loss due to narrowband filtering at client device versus bandwidth. Typical client bandwidths relative to the P(Y) code power spectral density (PSD) are shown in FIG. 12. These bandwidths can be quite narrow compared to the P(Y) PSD. FIG. 13 quantifies the power loss due to this filtering shown on curves 1302 and 1304 using a Butterworth filter and a boxcar filter respectively. As shown FIG. 13, the filter loss is about 0 dB if the client bandwidth is 20 MHz or more. However, typical bandwidths for GPS receivers in consumer devices (including cell phones) are set by the C/A code bandwidth. Hence, they range from 2 MHz to 8 MHz. As shown in FIG. 13, a client bandwidth of 2 MHz would introduce 7 dB of signal power loss. A bandwidth of 8 MHz would introduce around 2 dB of loss. Embodiments of the disclosure comprise server algorithms to reduce the impact of narrow client bandwidths and to recover some of this lost signal power.

Figure 14:
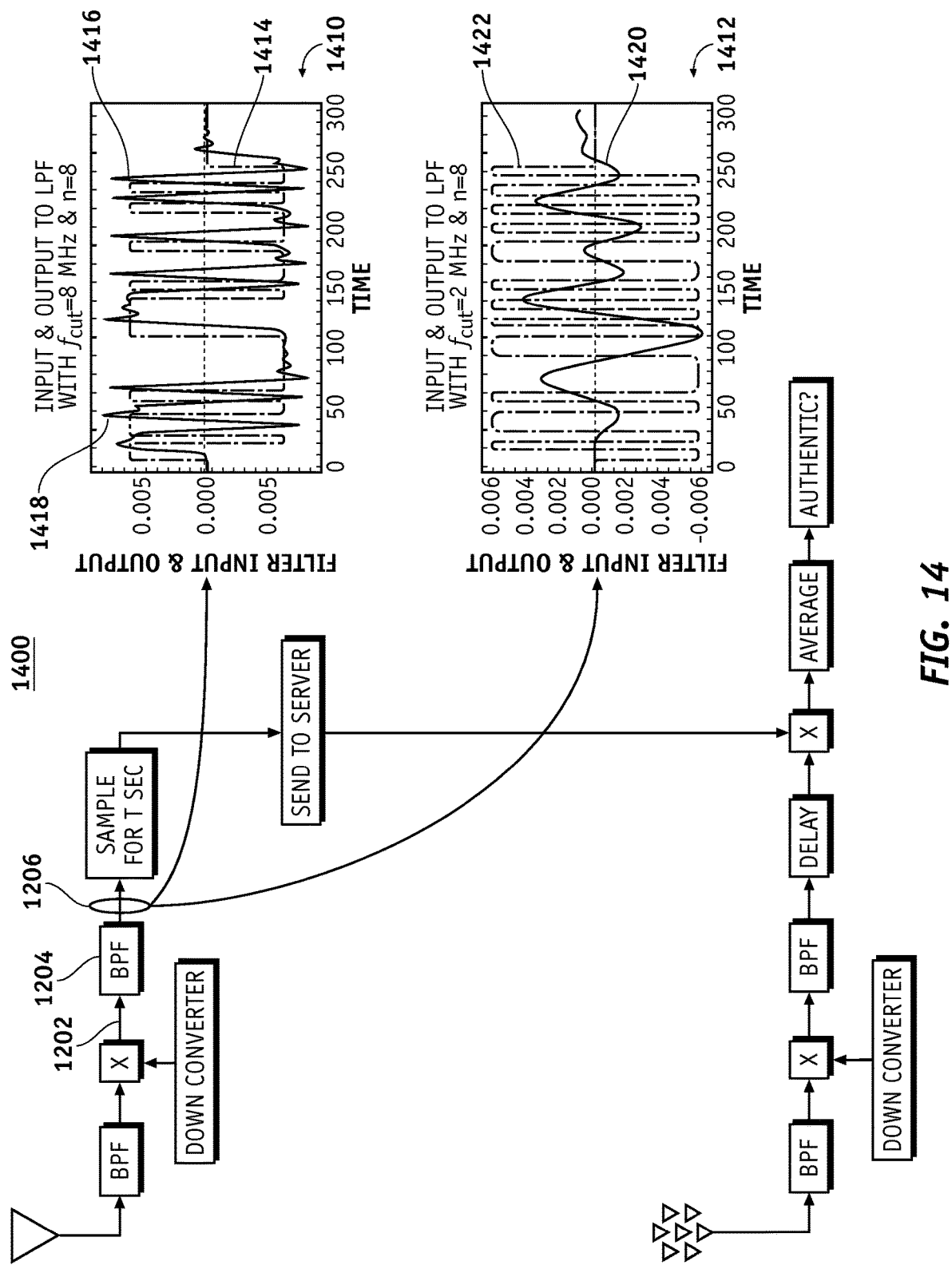
FIG. 14 is an illustration of an exemplary functional block diagram of an authentication system showing an impact of client band-pass filter (BPF) on waveform from a client to a server in a time domain.

FIG. 14 is an illustration of an exemplary functional block diagram of an authentication system 1400 showing an impact of client band-pass filter (BPF) on waveform from a client to a server in a time domain. FIG. 14 shows an impact of narrow bandwidth in a time domain in plots 1410 and 1412. The plot 1410 depicts the P(Y) code at the input 1202 and output 1206 of an 8 MHz BPF 1204. The input waveform 1414 is a crisp sequence of rectangular chips, but the output waveform 1416 begins to show appreciable softening of these chips. The output waveform 1416 rectangles no longer have sharp corners, and they are delayed relative to the input waveform 1414. An overshoot 1418 in the output waveform 1416 waveform is due to the so-called Gibbs effect.

The plot 1412 shows a much greater effect when the BPF 1204 has a 2 MHz bandwidth. In this example, an amplitude of an output waveform 1420 has been reduced and a response to an individual chip is difficult to discern. However, the output waveform 1420 does still respond to a sequence of input chips when they have a same sign.

The server 112 can mitigate the filtering loss shown in FIGS. 13 and 14. Most GPS receivers use a sequence of rectangles for their replica waveforms. This sequence of rectangles is well matched to the input waveforms 1414 and 1422. It is also reasonably well matched to the nearly rectangular output waveform 1416 when the bandwidth $f_{cut}$ is 8 MHz or greater. However, a sequence of rectangles is poorly matched to the output waveform 1420 from a 2 MHz BPF 1204.

Embodiments of the disclosure use a replica signature that is matched to the output waveform 1420. By so matching, the best possible performance is provides by the authentication process described herein. Indeed, the Schwartz inequality and detection theory call for correlation with a matched waveform when seeking the best possible performance in additive white Gaussian noise.

Figure 15:
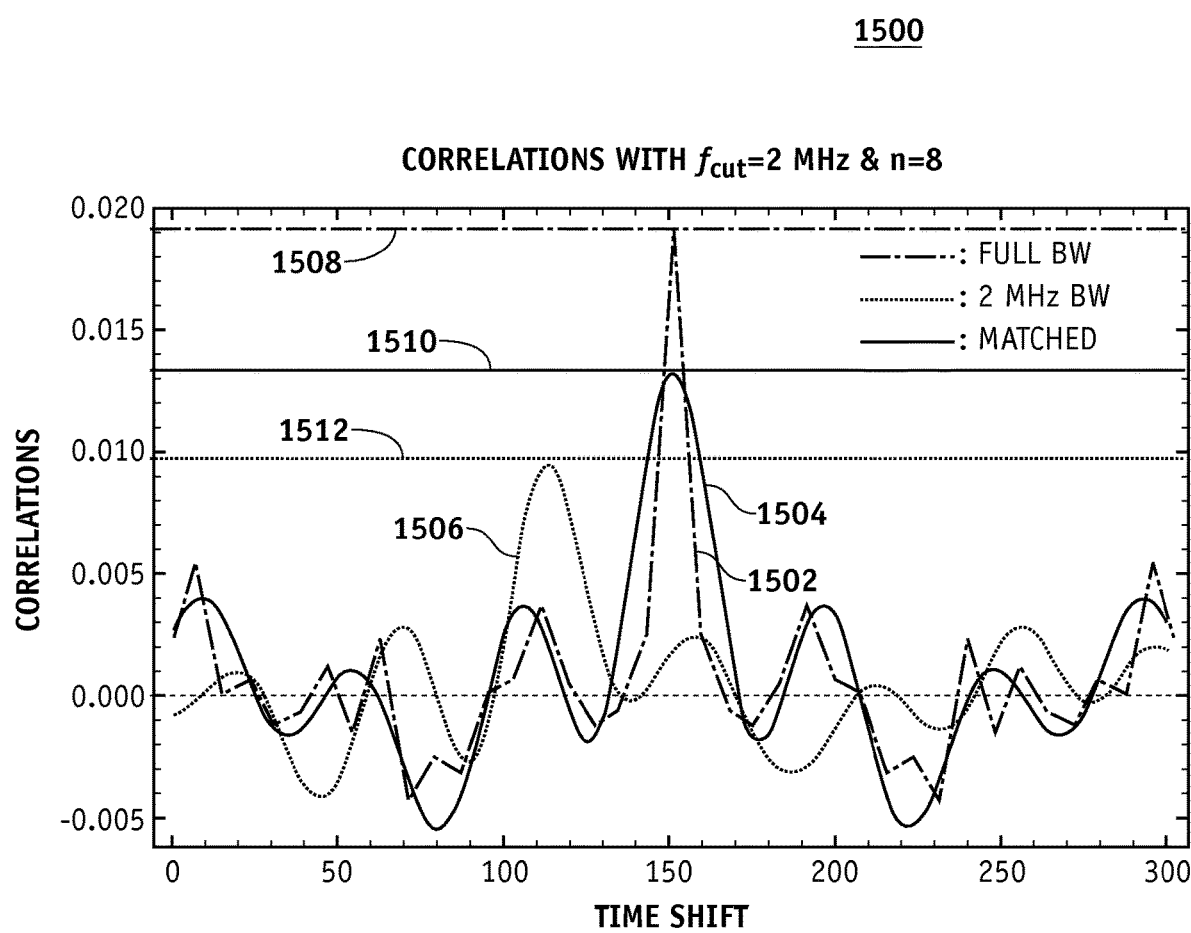
FIG. 15 is an illustration of an exemplary diagram showing a correlation function vs. time shift at various bandwidths.

FIG. 15 is an illustration of an exemplary diagram 1500 showing a correlation function vs. time shift at various bandwidths. FIG. 15 shows the correlation for three important situations shown by curves 1502, 1504 and 1506. A correlation peak 1508 of the curve 1502 normalizes the curve 1502; it is the correlation of two full bandwidth sequences of rectangles. A correlation peak 1510 of the curve 1504 is the correlation of two waveforms both filtered down to 2 MHz. In other words, it correlates the 2 MHz filtered waveform shown by the output waveform 1420 in FIG. 14 with itself. The amplitude is reduced from 0.019 to 0.013. The curve 1506 is to be avoided. It cross-correlates the 2 MHz filtered waveform with the corresponding sequence of rectangles. The amplitude is reduced from 0.019 to 0.010. This is a power loss of 20 $\log_{10}(0.010/0.019)$ or approximately 6 dB. As such, this result approximately agrees with the results from FIG. 13.

Figure 16:
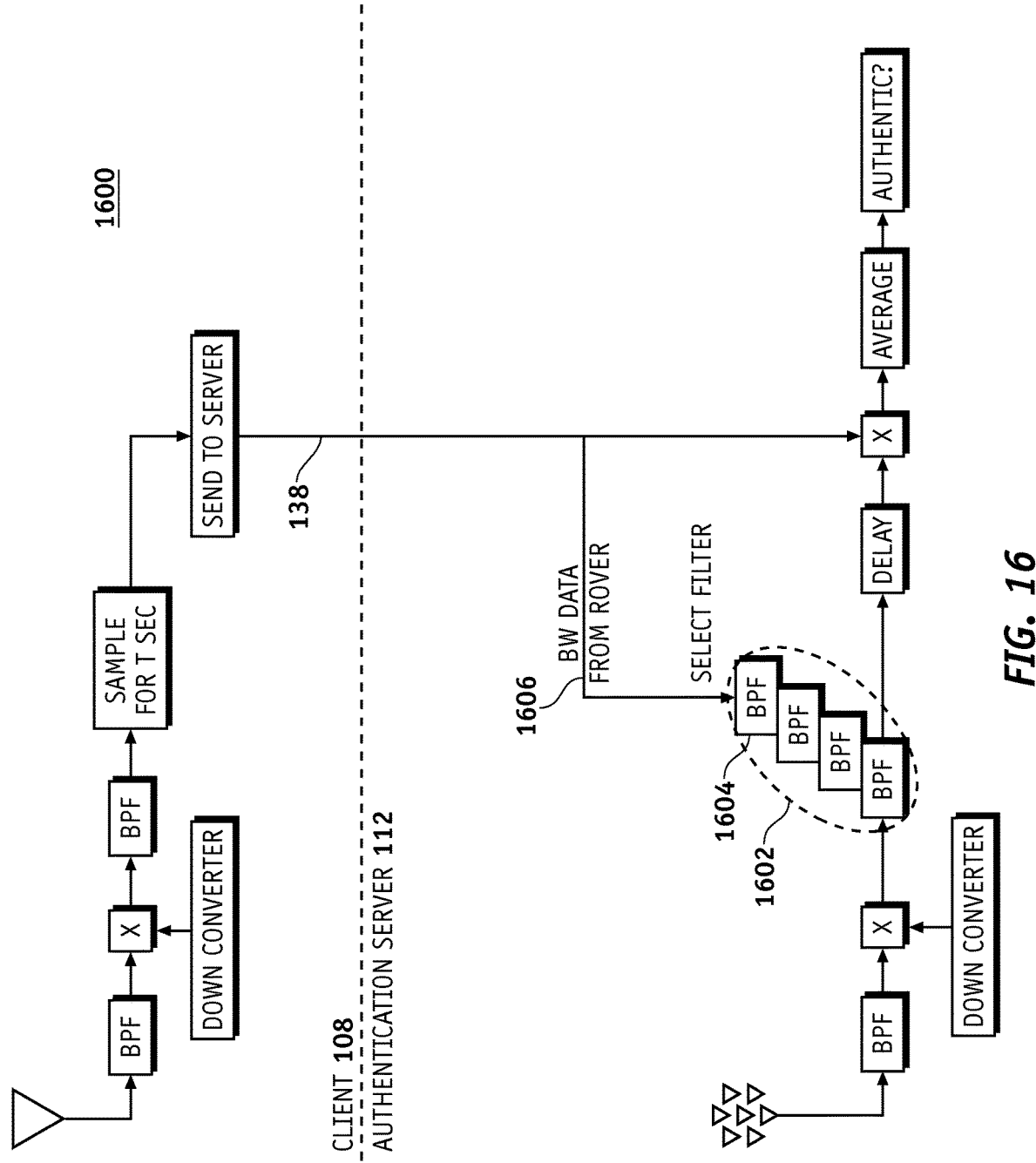
FIG. 16 is an illustration of an exemplary functional block diagram of an authentication system for adaptively compensating for reference bandwidth based on data from a client according to an embodiment of the disclosure.

Embodiments of the disclosure retain the performance of the curve 1504 and avoid loss associated with the curve 1506 by placing an adaptive band-pass filter (BPF) 1602 (bank of filters 1602) shown in FIG. 16 in a signal-processing path of the server 112.

FIG. 16 is an illustration of an exemplary functional block diagram of an authentication system (system 1600) for adapting reference bandwidth based on data from the client device 108 according to an embodiment of the disclosure. FIG. 16 comprises the adaptive BPF 1602 (filter bank 1602) as a bank of band-pass filter such as a selected filter 1604. The filter bank 1602 ensures that a client signature will be correlated with a server signature that is similarly filtered. In some embodiments, the selected filter 1604 is chosen based on explicit data from the client device 108. For example, the client device 108 may include a brief message field in the client signature 138 communicated over the network to the authentication server 112. For example, the brief message field or description field may comprise: the 3 dB bandwidth, order and group delay characteristics of each of the band-pass filters 1604. The server 112 chooses the selected filter 1604 to provide an optimal adaptation of the filter bank 1602 based on the brief message field in the client signature 138 and filters the server signature using the selected filter 1604 to cross-correlate with the client signature 138.

Figure 17:
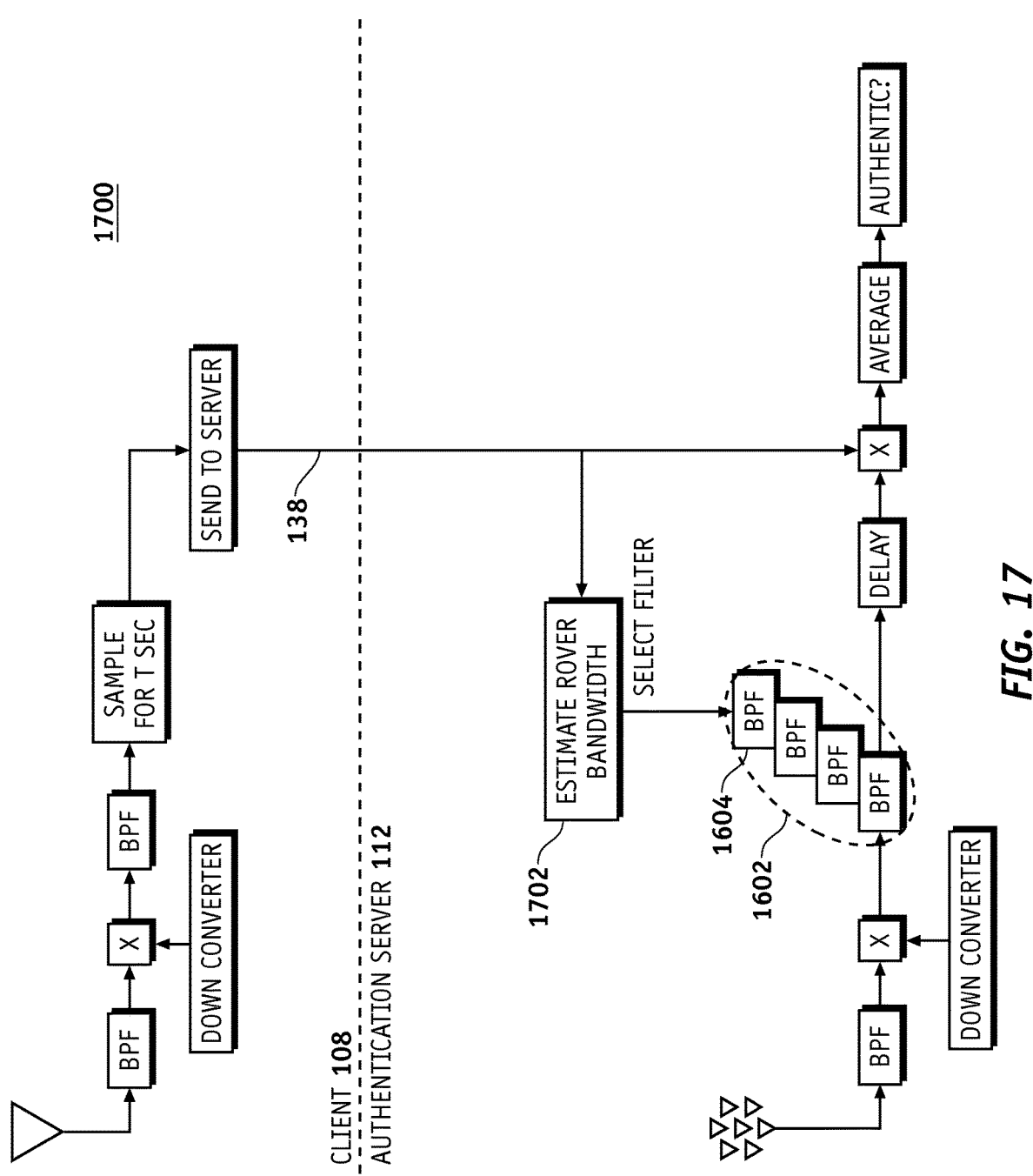
FIG. 17 is an illustration of an exemplary functional block diagram of an authentication system for adaptively compensating for reference bandwidth based on bandwidth estimation by reference according to an embodiment of the disclosure.

FIG. 17 is an illustration of an exemplary functional block diagram of an authentication system 1700 (system 1700) for adapting reference bandwidth based on bandwidth estimation by a reference according to an embodiment of the disclosure. This embodiment is based on the assumption that the client device 108 has not sent the brief message field or description field of its filter characteristics. However, the client device 108 has specified a sample rate of the data in the client signature 138. In this case, the server 112 computes a discrete Fourier transform (DFT) of the client signature 138 from the client device 108. Together with the known sampling rate, the server 112 can approximate a transfer function of the client processing chain. This data is used to choose the best possible adaptation available to the server 112.

Figure 18:
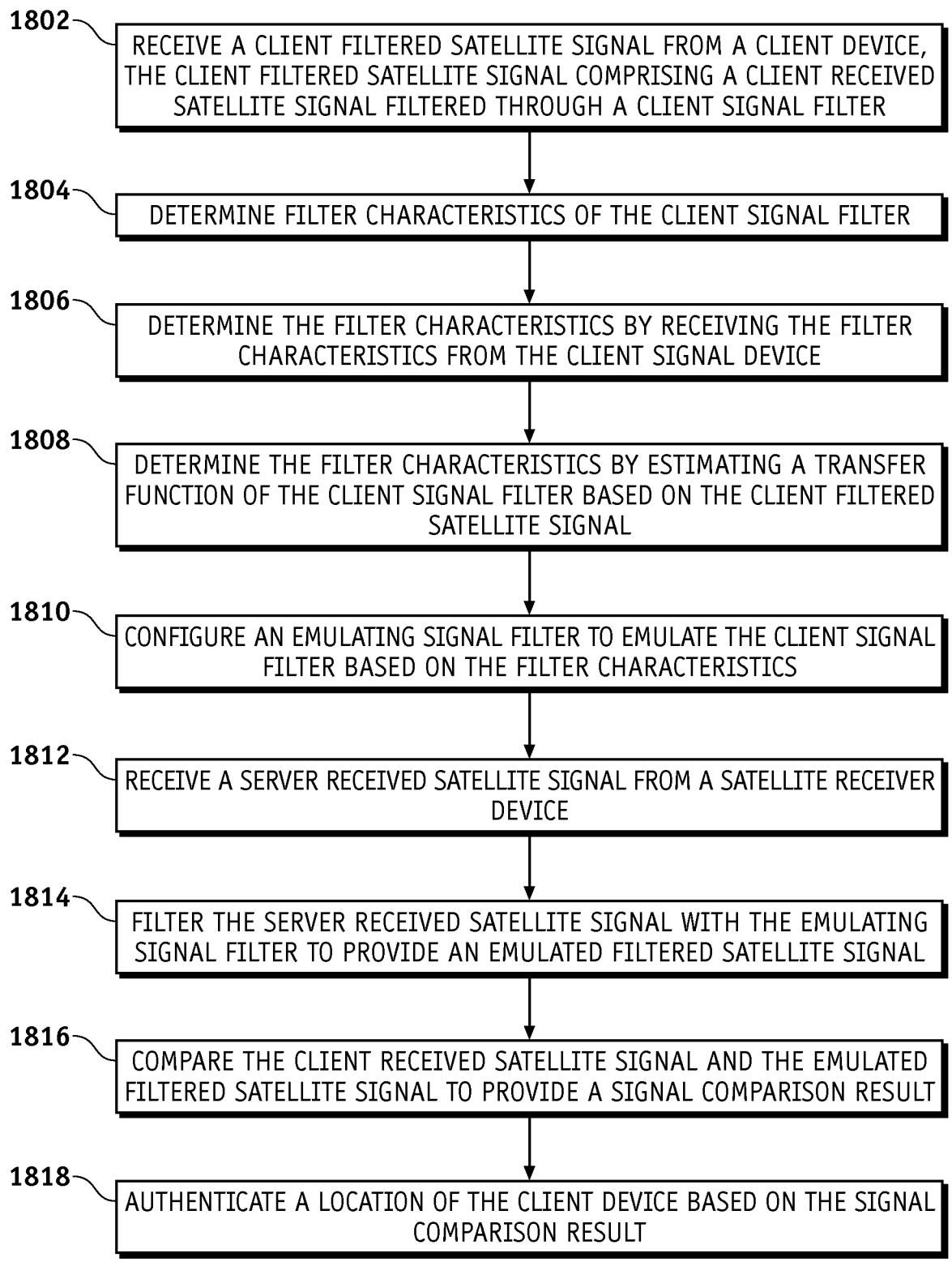
FIG. 18 is an illustration of an exemplary flowchart showing an authentication process for adapting reference bandwidth (BW) that can be performer by the authentication system of FIGS. 16 and 17 according to an embodiment of the disclosure.

FIG. 18 is an illustration of an exemplary flowchart showing an authentication process 1800 for adapting reference BW that can be performer by the authentication system of FIGS. 16 and 17 (systems 1600 and 1700) according to an embodiment of the disclosure. The various tasks performed in connection with the process 1800 may be performed by software, hardware, firmware, a computer-readable medium having computer executable instructions for performing the process method, or any combination thereof. The process 1800 may be recorded in a computer-readable medium such as a semiconductor memory, a magnetic disk, an optical disk, and the like, and can be accessed and executed, for example, by a computer CPU such as the processor module 512/538 in which the computer-readable medium is stored.

It should be appreciated that process 1800 may include any number of additional or alternative tasks, the tasks shown in FIG. 18 need not be performed in the illustrated order, and process 1800 may be incorporated into a more comprehensive procedure or process having additional functionality not described in detail herein. In some embodiments, portions of the process 1800 may be performed by different elements of the systems 500 and 600. 800, 1000 such as: the client device 108, the authentication server 112, etc. Process 1800 may have functions, material, and structures that are similar to the embodiments shown in FIGS. 1-12. Therefore common features, functions, and elements may not be redundantly described here.

Process 1800 may begin by receiving a client received satellite signal from a client device, the client received satellite signal filtered through a client signal filter (task 1802).

Process 1800 may continue by determining filter characteristics of the client signal filter (task 1804).

Process 1800 may continue by (FIG. 16) determining the filter characteristics by receiving the filter characteristics from the client signal filter (task 1806).

Process 1800 may continue by (FIG. 17) determining the filter characteristics by estimating the filter characteristics based on the client received satellite signal. For example, by estimating a transfer function of the client signal filter based on the client filtered satellite signal (task 1808).

Process 1800 may continue by configuring an emulating signal filter to emulate the client signal filter based on the filter characteristics (task 1810).

Process 1800 may continue by receiving a server received satellite signal from a satellite receiver device (task 1812).

Process 1800 may continue by filtering the server received satellite signal with the emulating signal filter to provide an emulated filtered satellite signal (task 1814).

Process 1800 may continue by comparing the client received satellite signal and the emulated filtered satellite signal to provide a signal comparison result (task 1816).

Process 1800 may continue by authenticating a location of the client device based on the signal comparison result (task 1818). In some embodiments, the client device 108 is allowed access to a protected resource if the location 122 of the client device 108 is valid, and the client device 108 is not allowed access to the protected resource if the location 122 of the client device 108 is invalid. The protected resource may comprise, for example but without limitation, a network, resource on a network, resource like a piece of hardware not locally controlled, or other resource. In some embodiments, an invalid result may direct the client device 108 to attention of law enforcement, a honeypot, or other action.

In some embodiments, systems 500, 600, 800, 1000 and 1700 may comprise any number of processor modules, any number of memory modules, any number of transmitter modules, and any number of receiver modules suitable for their operation described herein. The illustrated systems 500, 600, 800, 1000, and 1700 depict simple embodiments for ease of description. These and other elements of the 500, 600, 800, 1000 and 1700 are interconnected together, allowing communication between the various elements of 500, 600, 800, 1000 and 1700. In one embodiment, these and other elements of the systems 500, 600, 800, 1000 and 1700 may be interconnected together via a data communication bus (not shown).

A transmitter module (not shown) and a receiver module (not shown) may be located in each processor module 512/538 coupled to their respective shared antenna (not shown). Although in a simple module only one shared antenna may be used, more sophisticated modules may be provided with multiple and/or more complex antenna configurations. Additionally, although not shown in this FIGS. 5, 6, 8, 10, 16, and 17, those skilled in the art will recognize that a transmitter may transmit to more than one receiver, and that multiple transmitters may transmit to the same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In this manner, embodiments of the disclosure provide an authentication system that allows adequate sensitivity for a satellite signal to be received at a client device located in a low signal-to-noise-ratio (SNR) environment such as indoors and downtown.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skill in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 512/538 to cause the processor modules 512/538 to perform specified operations. Such instructions, generally referred to as "computer program code" or "program code" (which may be grouped in the form of computer programs or other groupings), when executed, enable a method of using a system such as the systems 500, 600, 800, 1000, 1600 and 1700.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1, 5, 6, 8, 10, 16 and 17 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for location authentication, the method comprising:
   receiving a client filtered satellite signal from a client device and information that specifies a sample rate associated with the client filtered satellite signal, the client filtered satellite signal comprising a client received satellite signal filtered through a client signal filter;
   determining filter characteristics of the client signal filter by one of:
      receiving the filter characteristics from the client device, and
      estimating a transfer function of the client signal filter based on the client filtered satellite signal and the sample rate associated with the client filtered satellite signal;
   configuring an emulating signal filter to emulate the client signal filter based on the filter characteristics;
   receiving a server received satellite signal from a satellite receiver device;
   filtering the server received satellite signal with the emulating signal filter to provide an emulated filtered satellite signal; and
   comparing the client received satellite signal and the emulated filtered satellite signal to provide a signal comparison result.

2. The method of claim 1, further comprising authenticating a location of the client device based on the signal comparison result.

3. The method of claim 2, wherein:
   the client device is allowed access to a protected resource if the location of the client device is valid; and
   the client device is not allowed access to the protected resource if the location of the client device is invalid.

4. The method of claim 1, wherein the filter characteristics are determined by receiving the filter characteristics from the client signal filter.

5. The method of claim 1, wherein the emulating signal filter is selected from a bank of filters based on the filter characteristics.

6. The method of claim 1, wherein the transfer function of the client signal filter is estimated based on a discrete Fourier transform the client filtered satellite signal.

7. The method of claim 1, wherein the client received satellite signal and the server received satellite signal are transmitted from at least one of the group consisting of: an LEO satellite, an MEO satellite, a GEO satellite, a Global Navigation Satellite System (GNSS) satellite, and a Global Positioning System (GPS) satellite.

8. A location authentication system comprising:
a server comprising a processor and a memory storing instructions, that
when executed by the processor, causes the server to:
receive a client filtered satellite signal from a client device and information that specifies a sample rate associated with the client filtered satellite signal, the client filtered satellite signal comprising a client received satellite signal filtered through a client signal filter;
determine filter characteristics of the client signal filter by one of receiving the filter characteristics from the client device, and estimating a transfer function of the client signal filter based on the client filtered satellite signal and the sample rate associated with the client filtered satellite signal;
configure an emulating signal filter to emulate the client signal filter based on the filter characteristics;
receive a server received satellite signal from a satellite receiver device;
filter the server received satellite signal with the emulating signal filter to provide an emulated filtered satellite signal; and
compare the client received satellite signal and the emulated filtered satellite signal to provide a signal comparison result.

9. The location authentication system of claim 8, wherein the server further authenticates a location of the client device based on the signal comparison result.

10. The location authentication system of claim 9, wherein: the client device is allowed access to a protected resource if the location of the client device is valid; and
the client device is not allowed access to the protected resource if the location of the client device is invalid.

11. The location authentication system of claim 8, wherein the filter characteristics are determined by receiving the filter characteristics from the client signal filter.he client signal filter.

12. The location authentication system of claim 8, wherein the emulating signal filter is selected from a bank of filters based on the filter characteristics.

13. The location authentication system of claim 8, wherein the transfer function of the client signal filter is estimated based on a discrete Fourier transform the client filtered satellite signal.

14. The location authentication system of claim 8, wherein the client received satellite signal and the server received satellite signal are transmitted from at least one of the group consisting of: an LEO satellite, an MEO satellite, a GEO satellite, a Global Navigation Satellite System (GNSS) satellite, and a Global Positioning System (GPS) satellite.

15. A location authentication system comprising:
a server comprising a processor and a memory storing instructions, that when executed by the processor, causes the server to:
receive a client filtered satellite signal from a client device and information that specifies a sample rate associated with the client filtered satellite signal, the client
filtered satellite signal comprising a client received satellite signal filtered through a client signal filter;
determine filter characteristics of the client signal filter by one of receiving the filter characteristics from the client device, and estimating a transfer function of the client signal filter based on the client filtered satellite signal and the sample rate associated with the client filtered satellite signal;
configure an emulating signal filter to emulate the client signal filter based on the filter characteristics;
receive a server received satellite signal from a satellite receiver device;
filter the server received satellite signal with the emulating signal filter to provide an emulated filtered satellite signal; and
authenticate a location of the client device based on a comparison of the client received satellite signal and the emulated filtered satellite signal.

16. The location authentication system of claim 15, wherein:
the client device is allowed access to a protected resource if the location of the client device is valid; and
the client device is not allowed access to the protected resource if the location of the client device is invalid.

17. The location authentication system of claim 15, wherein the filter characteristics are determined by receiving the filter characteristics from the client signal filter.

18. The location authentication system of claim 15, wherein the emulating signal filter is selected from a bank of filters based on the filter characteristics.

19. The location authentication system of claim 15, wherein the transfer function of the client signal filter is estimated based on a discrete Fourier transform the client filtered satellite signal.

20. The location authentication system of claim 15, wherein the client received satellite signal and the server received satellite signal are transmitted from at least one of the group consisting of: an LEO satellite, an MEO satellite, a GEO satellite, a Global Navigation Satellite System (GNSS) satellite, and a Global Positioning System (GPS) satellite.

* * * * *